US 12,371,281 B2

(12) United States Patent
Yamane et al.

(10) Patent No.: US 12,371,281 B2
(45) Date of Patent: Jul. 29, 2025

(54) PROCESSING SYSTEM

(71) Applicant: PACRAFT Co., Ltd., Tokyo (JP)

(72) Inventors: Noriyuki Yamane, Yamaguchi-ken (JP); Koichi Nakagawa, Yamaguchi-ken (JP); Kazuki Murata, Yamaguchi-ken (JP)

(73) Assignee: PACRAFT CO., LTD., Tokyo (JP)

( * ) Notice: Subject to any disclaimer, the term of this patent is extended or adjusted under 35 U.S.C. 154(b) by 18 days.

(21) Appl. No.: 18/450,195

(22) Filed: Aug. 15, 2023

(65) Prior Publication Data
US 2024/0059506 A1 Feb. 22, 2024

(30) Foreign Application Priority Data
Aug. 19, 2022 (JP) .................. 2022-131252

(51) Int. Cl.
*B65G 54/02* (2006.01)
*B65G 43/00* (2006.01)

(52) U.S. Cl.
CPC ............. *B65G 54/02* (2013.01); *B65G 43/00* (2013.01); *B65G 2201/0238* (2013.01); *B65G 2201/0252* (2013.01); *B65G 2203/0283* (2013.01); *B65G 2203/0291* (2013.01)

(58) Field of Classification Search
CPC ....... H02K 41/031; B65G 54/02; B65G 43/02
USPC ....................................... 198/805
See application file for complete search history.

(56) References Cited

U.S. PATENT DOCUMENTS 5,925,956 A 7/1999 Ohzeki
2013/0258307 A1* 10/2013 Mahadeswaraswamy ................. H02K 41/031 355/72
2019/0233152 A1 8/2019 Nakamoto
2020/0030995 A1 1/2020 Lu et al.
2021/0331878 A1 10/2021 Hauer et al.
(Continued)

FOREIGN PATENT DOCUMENTS

DE 102020120286 A1 2/2022
EP 0896936 A1 * 2/1999 ............ B65G 54/02
EP 3656707 A1 5/2020
(Continued)

OTHER PUBLICATIONS

Extended European Search Report dated Dec. 12, 2023, issued in corresponding European Patent Application No. 23191077.9 (11 pgs.).
(Continued)

Primary Examiner — James R Bidwell
(74) Attorney, Agent, or Firm — Pillsbury Winthrop Shaw Pittman LLP

(57) ABSTRACT

A processing system includes a conveyance system including: a conveyance body unit having a conveyance surface; a movable body moving along the conveyance surface; and a conveyance control unit controlling a magnetism acting between the movable body and the conveyance body unit, wherein the movable body moves along the conveyance surface in a floating state where the movable body is separated from the conveyance surface due to the magnetism, wherein the conveyance control unit controls the magnetism to variably adjust one or more of a movement trajectory, a rotation state, a movement speed, a movement time and a posture of the movable body.

18 Claims, 22 Drawing Sheets

(56) References Cited

U.S. PATENT DOCUMENTS

2022/0212883 A1  7/2022  Lu et al.

FOREIGN PATENT DOCUMENTS

| EP | 3904248 A1 | 11/2021 |
| JP | 09-017846 A | 1/1997 |
| JP | 2019-131260 A | 8/2019 |
| WO | 2020/109168 A1 | 6/2020 |
| WO | 2020/109180 A1 | 6/2020 |
| WO | 2020/109274 A1 | 6/2020 |
| WO | 2020/109276 A1 | 6/2020 |
| WO | 2020/109287 A1 | 6/2020 |
| WO | 2020/260564 A1 | 12/2020 |
| WO | 2020/260566 A1 | 12/2020 |
| WO | 2021/115545 A1 | 6/2021 |
| WO | WO-2021106799 A1 * | 6/2021 ........... B65G 49/061 |
| WO | 2021/185854 A1 | 9/2021 |
| WO | 2021/185904 A1 | 9/2021 |
| WO | 2021/198352 A1 | 10/2021 |
| WO | 2021/209558 A1 | 10/2021 |
| WO | 2021/239717 A1 | 12/2021 |
| WO | 2021/239757 A1 | 12/2021 |
| WO | 2021/250077 A1 | 12/2021 |
| WO | 2021/255001 A1 | 12/2021 |
| WO | 2022/090266 A1 | 5/2022 |
| WO | 2022/106555 A1 | 5/2022 |

OTHER PUBLICATIONS

Submission of Publications and Notice of of Submission of Publications issued in corresponding Japanese Patent Application No. 2022-131252, dated Apr. 30, 2025.

* cited by examiner

PROCESSING SYSTEM

CROSS-REFERENCE TO RELATED APPLICATIONS

This application is based upon and claims the benefit of priority from Japanese Patent Application No. 2022-131252, filed on Aug. 19, 2022; the entire contents of which are incorporated herein by reference.

TECHNICAL FIELD

The present disclosure relates to a processing system comprising a movable body that moves along a conveyance surface.

BACKGROUND ART

Japanese patent application publication No. 9-017846 discloses a magnetically levitated movable stage including a fixed stage and a movable stage that is driven in X, Y and Z directions by magnetic action with the fixed stage.

SUMMARY OF THE INVENTION

Conveyance systems often use conveyors and/or robots to move conveyance objects along a previously determined route. In packaging systems, typically, mechanical processing steps determined previously are carried out in sequence.

However, if, even when some irregular event occurs, processing proceeds based on the same predetermined route and predetermined mechanical processing steps as in a normal case, it is further required to perform processing in an irregularity addressing step (a drop-out process step), which reduces processing efficiency.

Further, the maglev technology makes it possible to change the speed on a predetermined route. By taking advantage of such maglev technology, it is possible to achieve movement in a fixed order within a defined route, but it is not possible to change the operating state of each individual movable body (such as a rotation state, a speed state, a travel distance, an operating time, a travel height, and a tilt state) with a high degree of freedom.

Therefore, for example, when a pouch (bag) having an inner accommodation space filled with contents is changed from an operating state to a stationary state along with a movable body while being placed on the movable body, the contents may spill out of the pouch due to inertia.

Furthermore, a drive source device and a power source device of a unit are conventionally provided in place in a fixed manner. In order for a device conveyed by a movable body to work with such a drive source device or a power source device, the movable body has to be moved along a predetermined route. In particular, in cases where a drive source device and/or a power source device are installed in intricate locations, the replacement of used devices and maintenance of devices are time-consuming and troublesome, and difficult work might be required to remove a device from another device.

An objective of the present disclosure is to provide a processing system with excellent convenience.

One aspect of the present disclosure is directed to a processing system comprising a conveyance system including: a conveyance body unit having a conveyance surface; a movable body moving along the conveyance surface; and a conveyance control unit controlling a magnetism acting between the movable body and the conveyance body unit, wherein the movable body moves along the conveyance surface in a floating state where the movable body is separated from the conveyance surface due to the magnetism, wherein the conveyance control unit controls the magnetism to variably adjust one or more of a movement trajectory, a rotation state, a movement speed, a movement time and a posture of the movable body.

The conveyance control unit may control the magnetism to variably adjust the movement trajectory of at least the movable body.

The conveyance control unit may control the magnetism to variably adjust at least the rotation state of the movable body.

The conveyance control unit may control the magnetism to variably adjust at least the posture of the movable body.

The processing system may comprise a processing device that performs processing using an article placed on the movable body arranged in a corresponding processing position of the conveyance surface, the article may include a bag holding device of holding a bag, and the processing device may perform a packaging-related process of the bag held by the bag holding device.

The processing system may comprise a processing device that performs processing using an article placed on the movable body arranged in a corresponding processing position of the conveyance surface, the article may include a bag holding device of holding a bag, and the processing device may perform a process related to attachment of a spout to the bag held by the bag holding device.

The processing system may comprise a processing device that performs processing using an article placed on the movable body arranged in a corresponding processing position of the conveyance surface, the article may include a spout holding device to hold a spout, and the processing device may perform a process related to the spout held by the spout holding device.

The processing system may comprise a processing device that performs processing using an article placed on the movable body arranged in a corresponding processing position of the conveyance surface, the article may include at least one of a drive source device and a power source device, and the processing device may perform a packaging-related process of a bag.

The processing system may comprise a processing device that performs processing using an article placed on the movable body arranged in a corresponding processing position of the conveyance surface, the article may include at least one of a drive source device and a power source device, and the processing device may perform a process related to attachment of a spout to a bag.

An article to be placed on the movable body may include a can.

An article to be placed on the movable body may include a container.

The processing system may comprise a processing device that places a wrapping on at least one movable body.

The processing system may comprise a processing device that places a packaged item on at least one movable body.

According to the present disclosure, a processing system with excellent convenience can be provided.

DETAILED DESCRIPTION

Specific embodiments of the present disclosure are described below with reference to the drawings. The relative size and positional relation between elements in each drawing do not necessarily correspond to actual size and positional relation.

First, examples of features of a conveyance system comprising a movable body are described, followed by examples of features of a processing system comprising such a conveyance system.

[Conveyance System]

Figure 1:
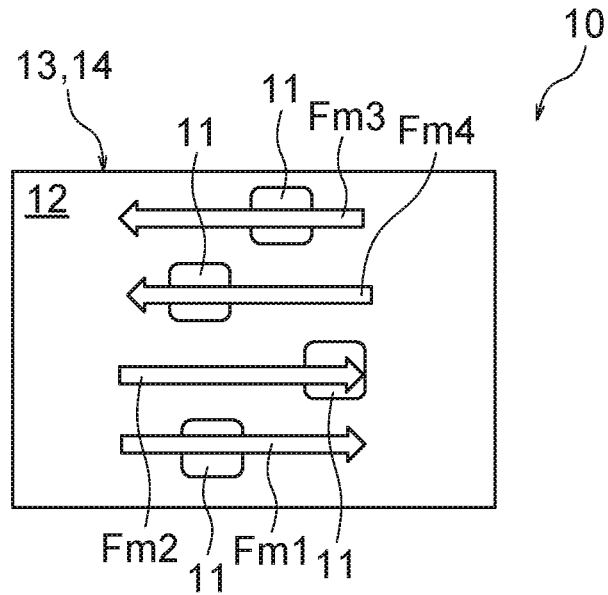
FIG. 1 is a plan view showing an example of a conveyance system.

FIG. 1 is a plan view showing an example of a conveyance system 10.

The conveyance system 10 comprises: a conveyance body unit 13 with a conveyance surface 12 that extends in a horizontal direction; a plurality of movable bodies 11 that move along the conveyance surface 12; and a conveyance control unit 14 that controls the magnetism acting between each movable body 11 and the conveyance body unit 13.

Each movable body 11 moves along the conveyance surface 12 in a floating state, separated from the conveyance surface 12, based on the magnetism acting between each movable body 11 and the conveyance body unit 13. By controlling the magnetism acting between each movable body 11 and the conveyance body unit 13, the conveyance control unit 14, for example, variably adjusts one or more of the movement trajectory, the rotation state, the movement speed, the movement time, and the posture (e.g., an inclined posture) of each movable body 11. In the following description, the movement of each movable body 11 (including movement and posture change) is basically performed by the conveyance control unit 14 controlling the magnetism acting between each movable body 11 and the conveyance body unit 13 as appropriate.

The above-described conveyance system 10 (the movable bodies 11, the conveyance surface 12, and the conveyance body unit 13) can be realized by combining any hardware and software as appropriate, and its specific physical configuration and control configuration are not limited. As an example, it is possible to realize the conveyance system 10 of the present embodiment based on the systems taught in the following publications: International Publication Nos. 2020/109287, 2020/260564, 2020/260566, 2021/185854, 2021/185904, 2021/198352, 2021/209558, 2021/239717, 2021/239757, 2021/250077, 2021/255001, 2022/106555, 2020/109168, 2020/109180, 2020/109274, and 2020/109276.

A movable body 11 can be moved efficiently by moving the movable body 11 along a first travel route Fm1 to a fourth travel route Fm4 shown in FIG. 1. In FIG. 1, the first travel route Fm1 and the second travel route Fm2 are conveyance routes (i.e., outward routes) for a movable body 11, while the third travel route Fm3 and the fourth travel route Fm4 are return routes of a movable body 11. A movable body 11 moving along the second travel route Fm2 can overtake a movable body 11 moving along the first travel route Fm1. Similarly, a movable body 11 moving along the fourth travel route Fm4 can overtake a movable body 11 moving along the third travel route Fm3.

By setting up overtaking routes (i.e., the second travel route Fm2 and the fourth travel route Fm4) in addition to normal routes (i.e., the first travel route Fm1 and the third travel route Fm3) in this manner, even if a preceding movable body 11 is stationary at a certain position on a normal route, a subsequent movable body 11 can move and overtake the preceding movable body 11 through an overtaking route. Specifically, a subsequent movable body 11 can move from a normal route to an overtaking route and overtake a preceding movable body 11 via the overtaking route. After overtaking the preceding movable body 11, the subsequent movable body 11 can return from the overtaking route to the normal route. This allows movable bodies 11 to move space-efficiently on a limited range of the conveyance surface 12, thereby suppressing increase in the size of the conveyance surface 12.

On the other hand, in conventional systems where no overtaking route is set and all the movable bodies move along a normal route, if a preceding movable body stops at a certain position on the normal route, subsequent movable bodies cannot move to a next destination position until the preceding movable body resumes moving. For instance, if a subsequent movable body conveys an item that does not require further processing (e.g., an item that has a defect such as a breakdown or damage), the subsequent movable body does not inherently need to pass through processing stations for doing subsequent processing, but in conventional systems, the subsequent movable body is to inevitably visit such processing stations following the preceding movable body. In such conventional systems, the movement efficiency of movable bodies is not necessarily good.

On the other hand, according to the conveyance system 10 shown in FIG. 1, subsequent movable bodies 11, if necessary, can go through overtaking routes (i.e., the second travel route Fm2 and the fourth travel route Fm4) to overtake preceding movable bodies 11. Therefore, subsequent movable bodies 11 do not necessarily have to follow the same route as preceding movable bodies 11, and can move to other processing stations or skip unnecessary processing stations without waiting for the completion of processing related to preceding movable bodies 11. This makes it possible to increase the efficiency of processing (e.g., production) of the system as a whole.

Figure 2:
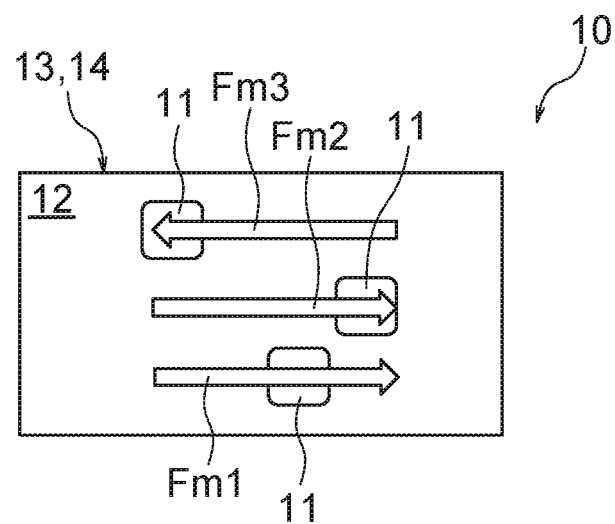
FIG. 2 is a plan view showing another example of a conveyance system.

FIG. 2 is a plan view showing another example of the conveyance system 10. In the present example of the conveyance system 10, a first travel route Fm1 and a second travel route Fm2 are set as conveyance routes, as in the conveyance system 10 shown in FIG. 1, but only a third travel route Fm3 is set as a return route. In this manner, for only one of the conveyance route and the return route, an overtaking route (i.e., the second travel route Fm2) may be set in addition to a normal route.

Figure 3:
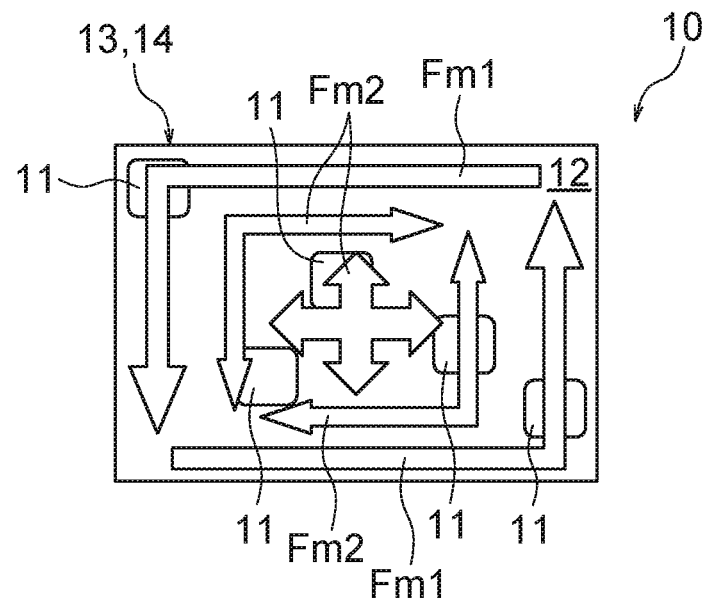
FIG. 3 is a plan view showing another example of a conveyance system.

FIG. 3 is a plan view showing another example of the conveyance system 10.

In the present example of the conveyance system 10, an outer route (i.e., a first travel route Fm1) along the outer circumference of the conveyance surface 12 and an inner route (i.e., a second travel route Fm2) inside the outer route (in the center side area inside the outer circumference of the conveyance surface 12) are set. The first travel route Fm1 (the outer route) can be established, for example, as a normal route extending through various processing stations. On the other hand, the second travel route Fm2 (the inner route) can be established as an overtaking route. In a case where a processing station is provided in the center side area of the conveyance surface 12, the second travel route Fm2 (the inner route) is used also as a normal route (see FIG. 4 described below).

The second travel route Fm2 (the inner route) in the present example is a route along the central side area of the conveyance surface 12 that has a two-dimensional spread. Therefore, in the present example, the second travel route Fm2 (the inner route) can be set as a rectilinear route, but can be set also as a non-rectilinear route, which can further improve the movement efficiency of each movable body 11 compared to a case where an overtaking route is provided as a rectilinear route (see FIGS. 1 and 2).

Figure 4:
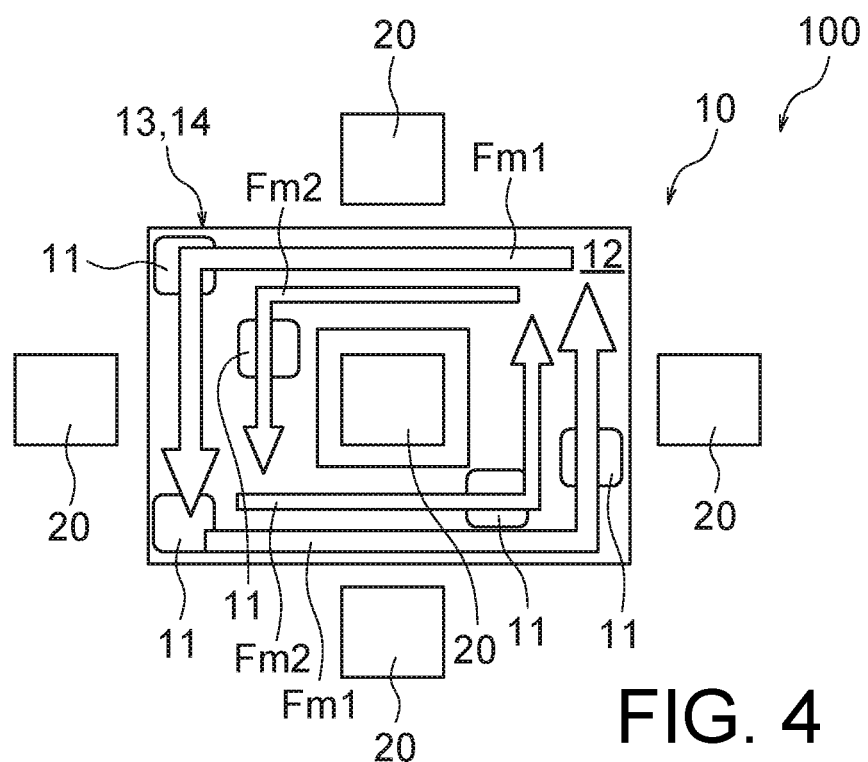
FIG. 4 is a plan view showing an example of a processing system comprising another example of a conveyance system and a processing unit.

FIG. 4 is a plan view showing an example of a processing system 100 comprising a conveyance system 10 of another example and processing devices 20.

In the conveyance system 10 of the present example, processing devices 20 are provided not only on the outside of the conveyance surface 12 but also on the inside of the conveyance surface 12. In addition, as travel routes for each movable body 11, an outer route (a first travel route Fm1) along the outer circumference of the conveyance surface 12 and an inner route (a second travel route Fm2) inside the outer route surrounding a processing device 20 provided inside the conveyance surface 12 are set.

Each movable body 11 can receive, on the first travel route Fm1 (the outer route), processing of each processing device 20 provided outside the conveyance surface 12 and can receive, on the second travel route Fm2 (the inner route), processing of the processing device 20 provided inside the conveyance surface 12. Therefore, the first travel route Fm1 (the outer route) can be used as a normal route for processing performed by each processing device 20 provided outside the conveyance surface 12 and can be used as an overtaking route for processing performed by the processing device 20 provided inside the conveyance surface 12. On the other hand, the second travel route Fm2 (the inner route) can be used as a normal route for the processing performed by the processing device 20 provided inside the conveyance surface 12 and can be used as an overtaking route for processing performed by each processing device 20 provided outside the conveyance surface 12.

The processing performed by each processing device 20 is not limited. For instance, a packaging-related process using a bag and a process of attaching a spout to a bag may be performed by each processing device 20. The specific processes that may be included in the packaging-related process here are basically not limited. For instance, the packaging-related process may include a process of passing a bag B to a bag holding device 30, a process of printing on a bag B, a process of inspecting the printing condition of a bag B, a process of opening the mouth portion of a bag B, a process of introducing contents into the inner accommodation space of a bag B, a process of closing the mouth portion of a bag B, a process of sealing the mouth portion of a bag B, and a process of releasing a bag B (a product bag) that has a sealed mouth portion and the inner accommodation space in which the contents are contained, to send it to a later stage.

Figure 5:
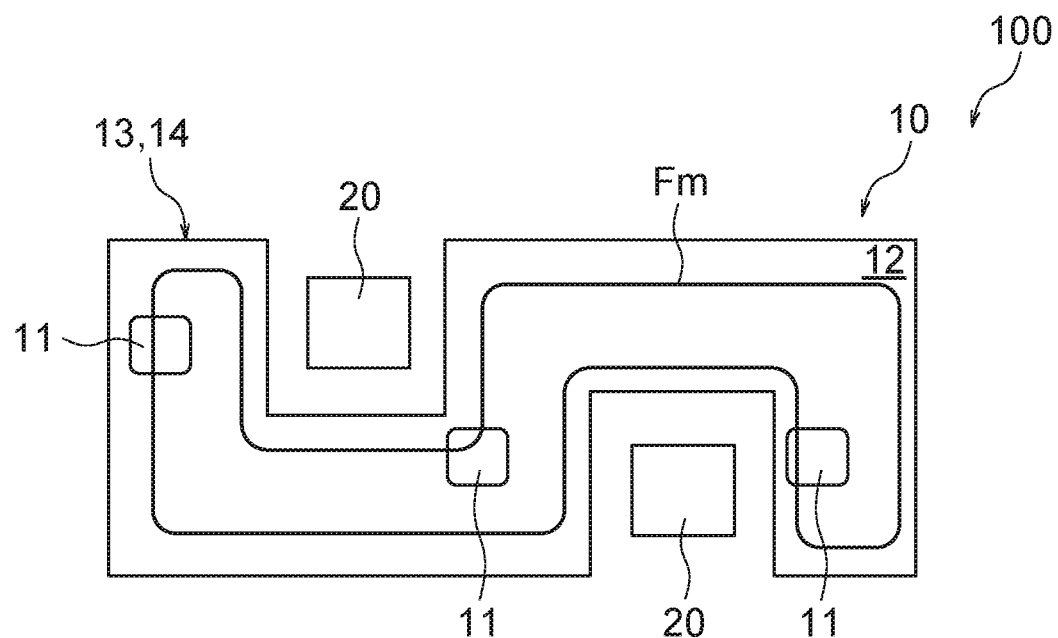
FIG. 5 is a plan view showing another example of a processing system comprising a conveyance system and a processing unit.

FIG. 5 is a plan view showing another example of the processing system 100 comprising the conveyance system 10 of another example and processing devices 20.

In the conveyance system 10 of the present example, a single travel route Fm is set as a travel route for each movable body 11, but the travel route Fm has a relatively complex route shape depending on a position (a processing station) for processing performed by each processing device 20.

As described above, according to conveyance systems 10 of the present embodiment, a travel route of each movable body 11 can be freely set in a two-dimensional manner within a range of the conveyance surface 12, and a travel route of each movable body 11 can be optimized flexibly according to the arrangement of processing devices 20.

Figure 6:
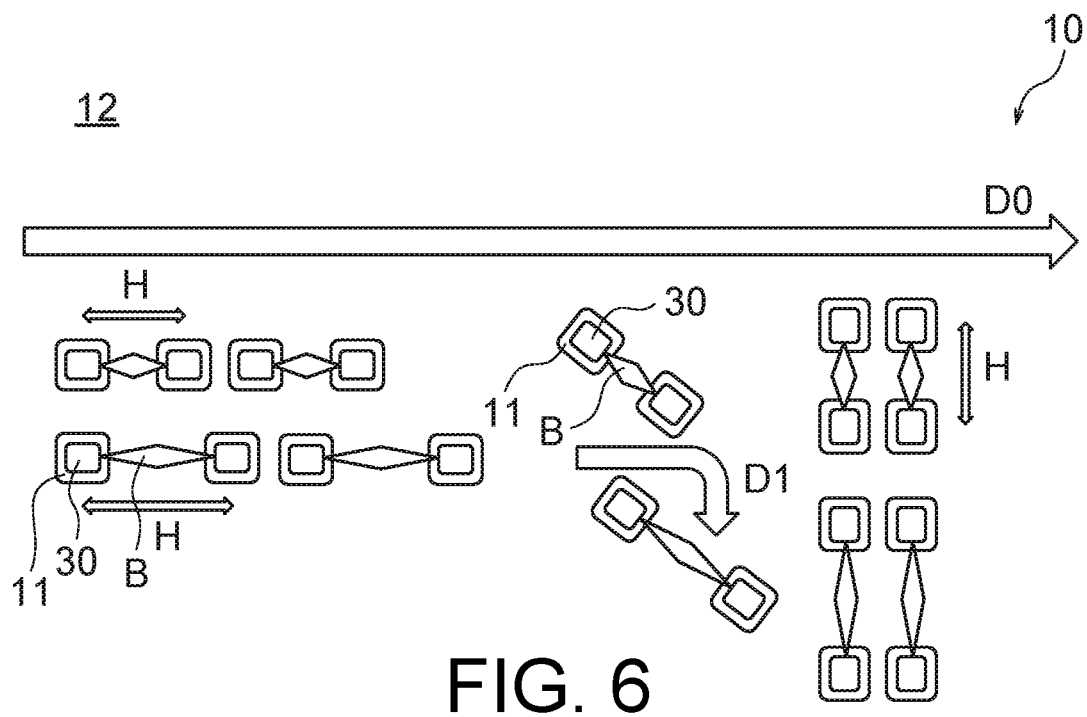
FIG. 6 is a plan view showing another example of a conveyance system.

FIG. 6 is a plan view showing another example of the conveyance system 10.

In the conveyance system 10 of the present example, a bag holding device 30 (e.g., a gripper device) for holding a bag B is fixedly placed on each movable body 11 and is moved along the conveyance surface 12 together with a corresponding movable body 11.

In the example shown in FIG. 6, two bag holding devices 30, which are placed on two movable bodies 11, form a pair and move along with a bag B within a range of the conveyance surface 12 while holding both side portions of the bag B.

Each movable body 11 can move freely in two-dimensional manner along the conveyance surface 12. Therefore, the distance (i.e., a holding distance H) between two movable bodies 11 forming a pair can be variably changed according to the width between both side portions of a bag B that is a target to be held. Therefore, according to the conveyance system 10 of the present example, even multiple types of bags B having different widths can be conveyed in a state where being properly held by a pair of bag holding devices 30.

Movable bodies 11 move, together with corresponding bag holding devices 30 and a bag B, along a movement direction D0 indicated by an arrow in FIG. 6 as a whole, while two movable bodies 11 forming a pair can move to change the relative position between each other, so that the orientation of a corresponding bag B can be freely changed.

For instance, two movable bodies 11 forming a pair can move (turn) in a turning direction D1 indicated by an arrow in FIG. 6 to change the orientation of a bag B by 90°. In this case, it is also possible that, after a bag B is moved in the movement direction D0 in such a manner that the width direction of the bag B coincides with the movement direction D0, the bag B is turned in the turning direction D1 to change the orientation of the bag B, and then the bag B is moved in the movement direction D0 in a state where the width direction of the bag B is perpendicular to the movement direction D0. This makes it possible to, for example, arrange a plurality of bags B at a processing station in such a manner that the plurality of bags B are aligned in the thickness direction of the bags B (i.e., a direction that is perpendicular to the width direction), while each bag B may be moved between processing stations in any orientation (for example, an orientation that effectively prevents contents inside a bag B from flying out of the bag B). For instance, at a station (a liquid filling station) where a processing for introducing contents into a bag B is performed, it is possible to place two bags B side by side in the thickness direction of the bags B and to inject a liquid content into the respective bags B simultaneously from two nozzles. In this case, the liquid filling process can be performed in a state where the occupied range (i.e., occupied area) of two bags B in terms of the movement direction D0 is kept small.

As described above, the conveyance system 10 of the present example can flexibly deal with multiple types of bags B having various sizes (widths). It is also possible to adaptively change the orientation of each bag B during each of a bag conveyance and a bag processing, thereby improving processing efficiency.

Figure 7:
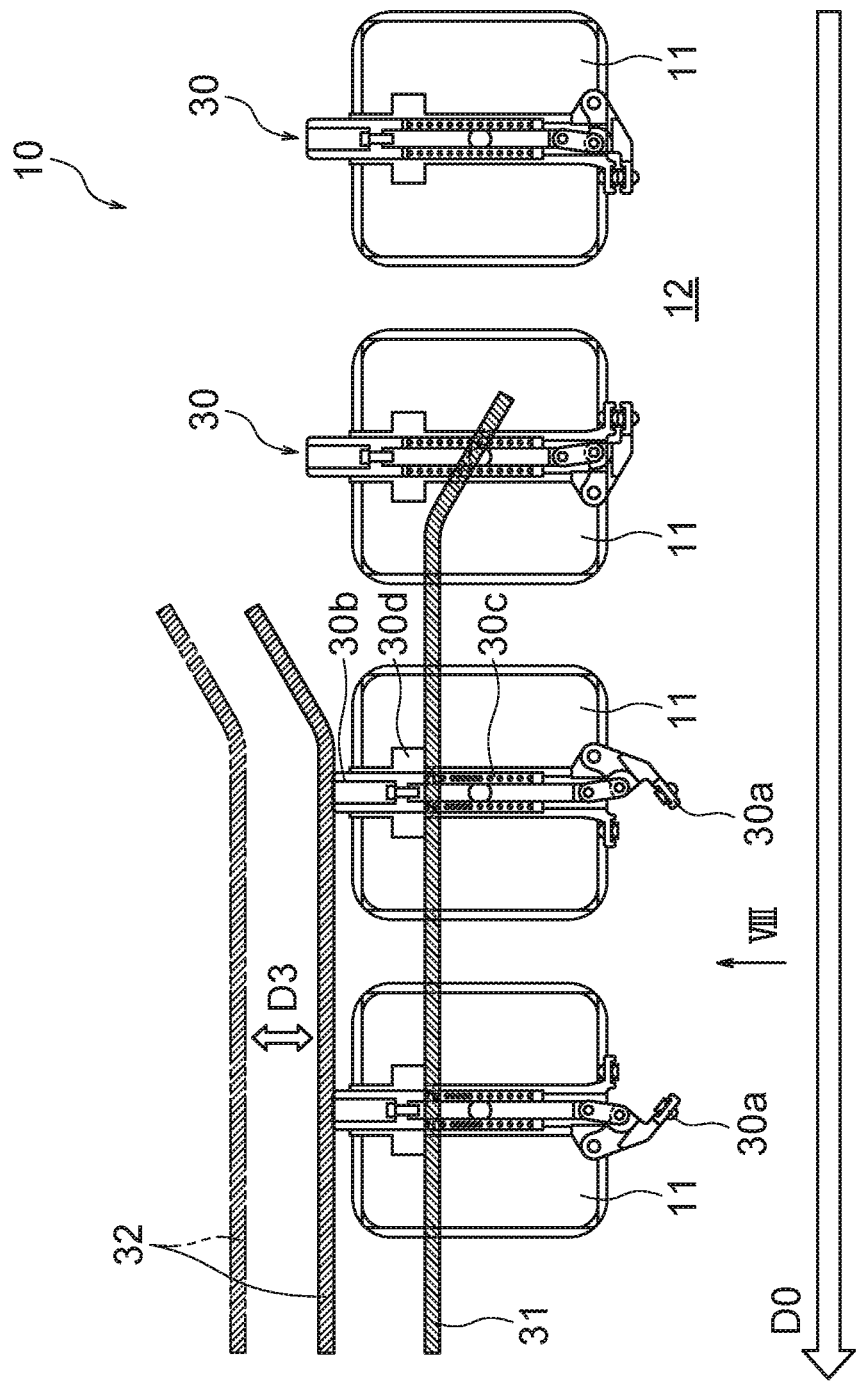
FIG. 7 is a plan view showing another example of a conveyance system.
Figure 8:
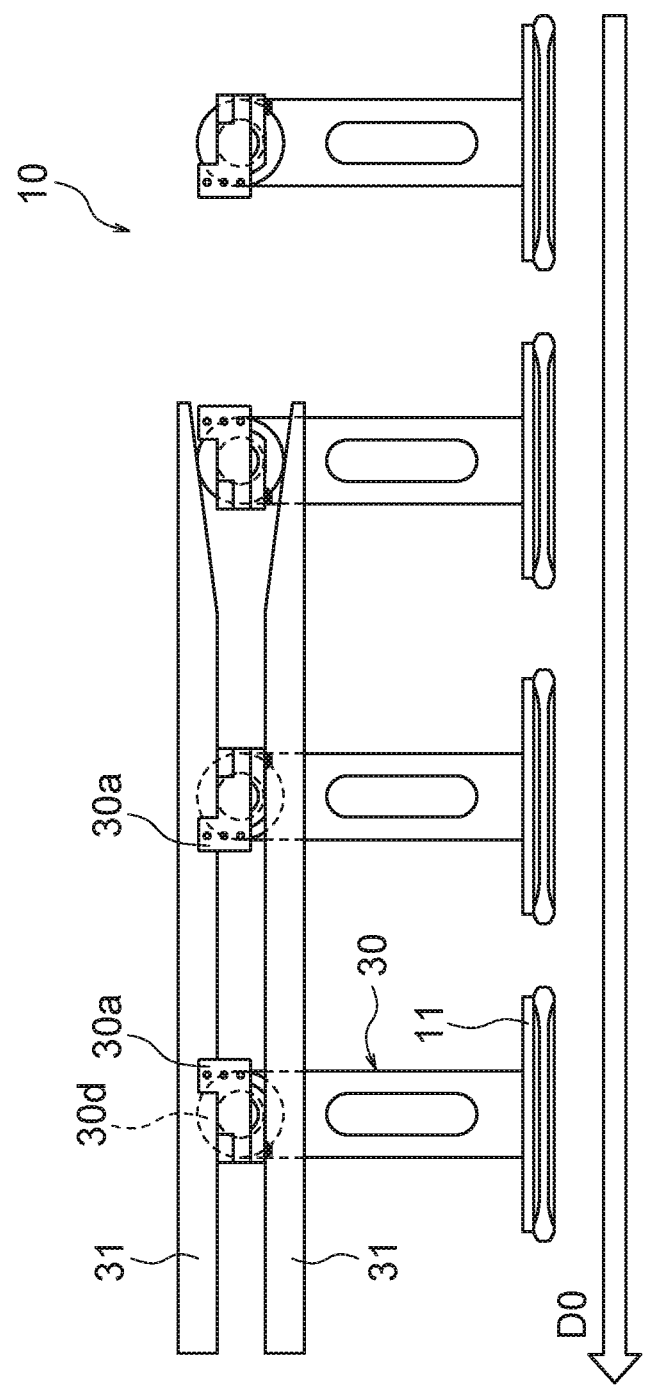
FIG. 8 is a diagram showing the conveyance system shown in FIG. 7 viewed in a direction of an arrow VIII in FIG. 7.

FIG. 7 is a plan view showing another example of the conveyance system 10. FIG. 8 is a view of the conveyance system 10 shown in FIG. 7 viewed in the direction of an arrow VIII in FIG. 7. In FIG. 7, the inside state of each bag holding device 30 is shown in a see-through manner. In FIG. 8, indication of an opening-closing movable member 32 is omitted and holding sections 30a that are actually in an open state (a first and a second holding sections 30a from the left in FIG. 8) are shown in a closed state.

In the conveyance system 10 of the present example, a fixed guide 31 and an opening-closing movable member 32 that act as an opening-closing unit for opening and closing the holding section 30a (a gripping section) of each bag holding device 30 are provided. The opening-closing movable member 32 is moved back and forth in a horizontal direction (a pressing/opening direction D3) by a driving device (not shown in the drawings) driven under the control of the conveyance control unit 14 (see FIG. 1, etc.) to move closer to or away from the fixed guide 31.

Each of the fixed guide 31 and the opening-closing movable member 32 shown in FIG. 7 has an invitation shape to guide each bag holding device 30 into a space between the fixed guide 31 and the opening-closing movable member 32. Specifically, the upstream end of the fixed guide 31 with respect to the movement direction D0 of each movable body 11 and each bag holding device 30 is inclined to gradually approach the opening-closing movable member 32 toward the movement direction D0. Similarly, the upstream end of the opening-closing movable member 32 is inclined to gradually approach the fixed guide 31 toward the movement direction D0.

The fixed guide 31 includes an upper fixed guide section and a lower fixed guide section that are spaced apart in the height direction, as shown in FIG. 8. A bag holding device 30 (in particular, a holding body part 30d described below), which moves in the movement direction D0, penetrates the space between the upper fixed guide section and the lower fixed guide section of the fixed guide 31.

Each bag holding device 30 includes: a holding body part 30d that supports a holding section 30a in such a manner that the holding section 30a can open and be closed freely; an opening-closing elastic device 30c (e.g., a compression spring) provided inside the holding body part 30d; and an opening-closing control member 30b that is supported by the holding body part 30d to be able to slide freely. The opening-closing elastic device 30c is compressed between the holding section 30a and the opening-closing control member 30b to exert an elastic force on the opening-closing control member 30b to cause the opening-closing control member 30b to protrude from the holding body part 30d.

The opening-closing control member 30b partially protrudes from the holding body part 30d while being supported by the holding body part 30d in a state of receiving no external force. By bringing the opening-closing movable member 32 closer to the fixed guide 31 while the opening-closing control member 30b is positioned between the fixed guide 31 and the opening-closing movable member 32, the opening-closing control member 30b is pushed into the inner space of the holding body part 30d. This causes the compression of the opening-closing elastic device 30c and a large elastic force acts from the opening-closing elastic device 30c to the holding section 30a, and consequently the holding section 30a opens. On the other hand, when the opening-closing movable member 32 moves away from the fixed guide 31 and separates from the opening-closing control member 30b, the opening-closing control member 30b returns to its original position due to the elastic force received from the opening-closing elastic device 30c and the elastic force acting from the opening-closing elastic device 30c to the holding section 30a is reduced, and consequently the holding section 30a closes. As long as each bag holding device 30 is not positioned between the fixed guide 31 and the opening-closing movable member 32 and no external force is applied to the opening-closing control member 30b, a corresponding holding section 30a is closed.

When the opening-closing control member 30b is pushed into the inner space of the holding body part 30d by the opening-closing movable member 32, an enlarged diameter portion of the holding body part 30d (i.e., a portion having a locally larger outer diameter) is pressed against the fixed guide 31 (i.e., the upper fixed guide section and the lower fixed guide section) and the movement of the holding body part 30d (consequently, of the entire bag holding device 30) is restricted by the fixed guides 31.

In this manner, the opening movement and the closing movement of the holding sections 30a of a pair of bag holding devices 30 are performed by the opening-closing unit including the fixed guide 31 and the opening-closing movable member 32, and thereby a bag can be held and released by a pair of bag holding devices 30. Such a fixed guide 31 and an opening-closing movable member 32 (an opening-closing unit) may be installed at any processing station. For instance, a fixed guide 31 and an opening-closing movable member 32 (an opening-closing unit) may be installed at a station for supplying bags to bag holding devices 30, a station for releasing bags (e.g., product bags or defective bags) from bag holding devices 30, and another station where a bag is handed over (e.g., a bag is passed from one device to another device to change the manner of holding the bag).

Although the opening-closing elastic device 30c described above includes a compression spring, the opening-closing elastic device 30c may include another means (e.g., a device that applies elastic force to holding sections 30a and opening-closing control members 30b) instead of a compression spring.

Figure 9:
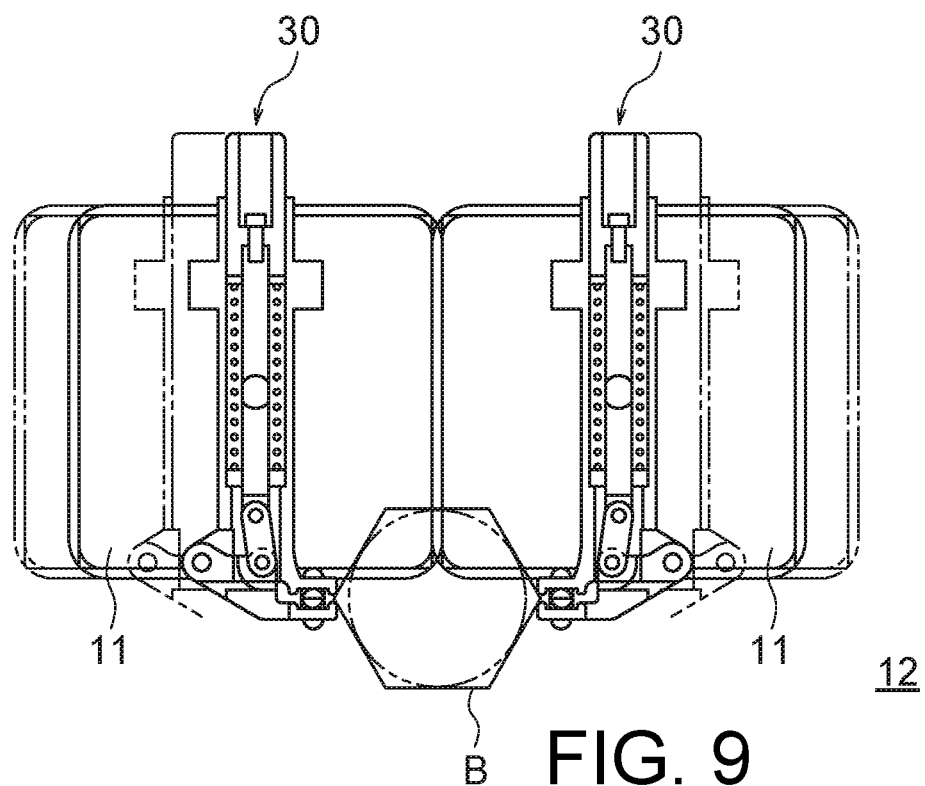
FIG. 9 is a top view showing an example of a movable body pair and a corresponding bag holding device pair.
Figure 10:
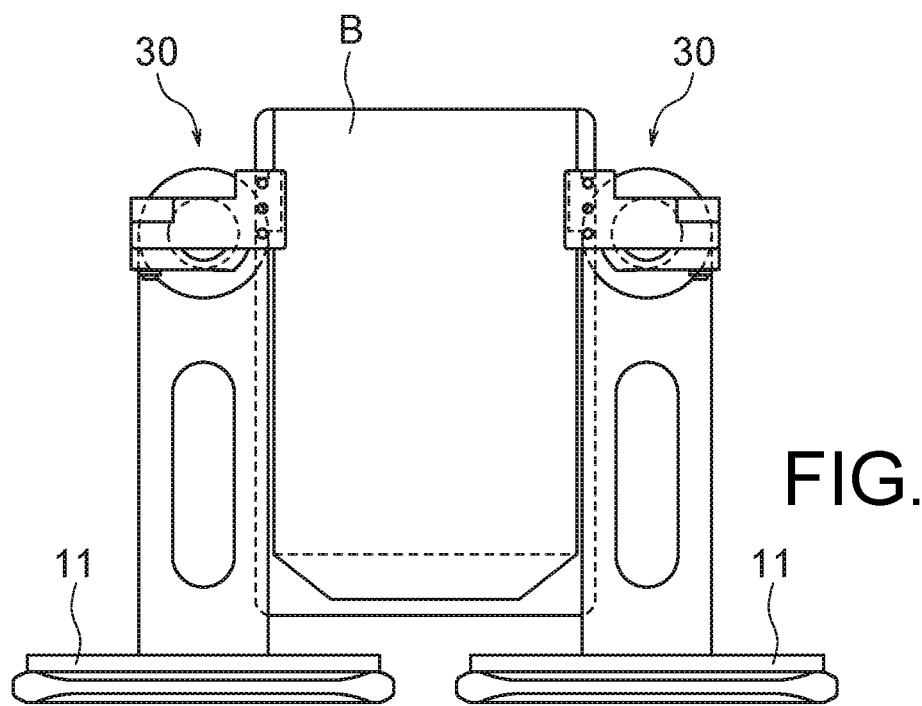
FIG. 10 is a front view showing an example of a movable body pair and a corresponding bag holding device pair.

FIG. 9 is a top view showing an example of a pair of movable bodies 11 and a corresponding pair of bag holding devices 30. FIG. 10 is a front view showing an example of a pair of movable bodies 11 and a corresponding pair of bag holding devices 30.

Each movable body 11 can take various drive forms depending on details of processes.

For instance, as shown in FIGS. 9 and 10, by moving each movable body 11 so as to change the distance (spacing) between two movable bodies 11 forming a pair, the distance between two bag holding devices 30 mounted on the respective movable bodies 11 can be changed. As a result, a bag B held by the pair of bag holding devices 30 can be flexed or strained to open or close the mouth portion of the bag B.

Figure 11:
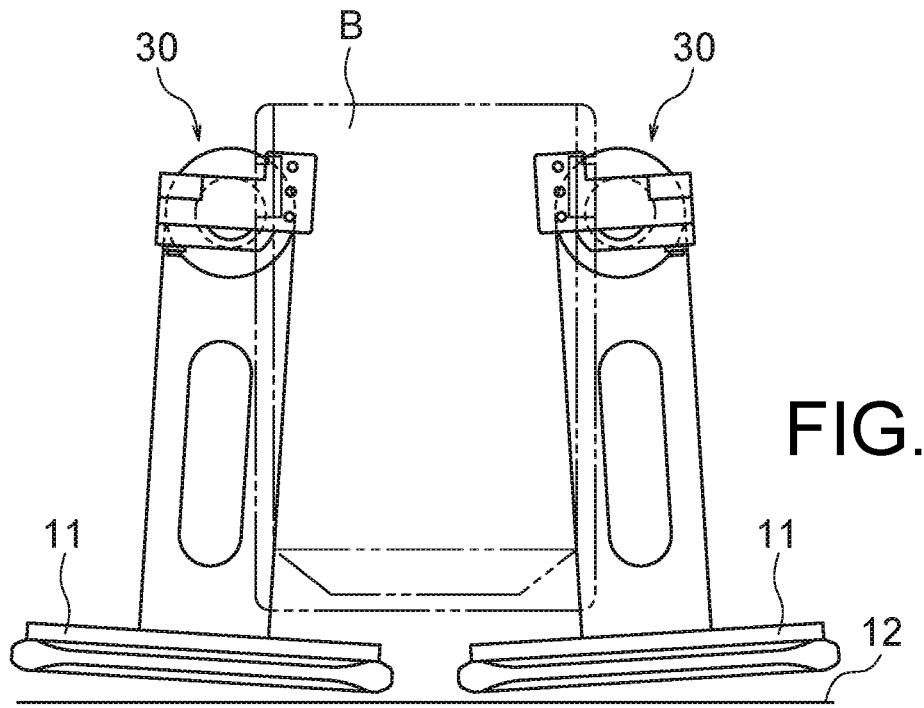
FIG. 11 is a front view showing another example of the operation of a movable body pair and a corresponding bag holding device pair.
Figure 12:
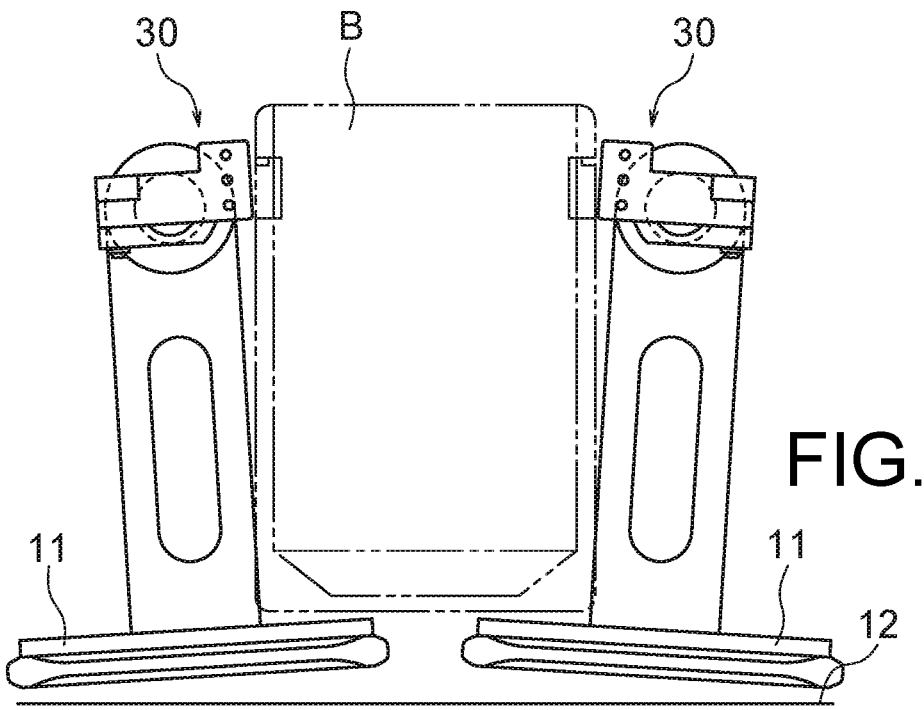
FIG. 12 is a front view showing another example of the operation of a movable body pair and corresponding bag holding device pair.

FIG. 11 is a front view showing another example of an operation of a pair of movable bodies 11 and a pair of bag holding devices 30. FIG. 12 is a front view showing another example of an operation of a pair of movable bodies 11 and a pair of bag holding devices 30.

It is also possible to open and close the mouth portion of a bag B by controlling the posture (in particular, a tilted posture) of each movable body 11 as shown in FIGS. 11 and 12. For instance, as shown in FIG. 11, by raising the outer ends of two movable bodies 11 that form a pair higher than the inner ends thereof, the holding sections 30a located at the upper ends of two bag holding devices 30 mounted on the respective movable bodies 11 are brought closer to each other. As a result, the mouth portion of a bag B held by these holding sections 30a can be bent open. On the other hand, as shown in FIG. 12, by raising the inner ends of two movable bodies 11 that form a pair higher than the outer ends thereof, the holding sections 30a of the two bag holding devices 30 mounted on the respective movable bodies 11 move away from each other. As a result, the mouth portion of a bag B held by these holding sections 30a can be tensed and closed.

According to the driving configuration of each movable body 11 as shown in FIGS. 9 through 12 described above, the degree of deflection and tension of a bag B and the opening-closing state (the degree of opening and closing) of the mouth portion of a bag B can be changed adaptively. Therefore, by driving each movable body 11 according to details of processes, the degree of deflection and tension of a bag B and the opening-closing state (the degree of opening and closing) of the mouth portion of a bag B can be optimized for details of processes.

For instance, in a bag supply processing, after a bag B is supplied to bag holding devices 30, by driving a corresponding pair of movable bodies 11 in such a manner that the bag B held by the pair of bag holding devices 30 gets strained slightly, the position of the bag B (in particular, the position relative to a pair of bag holding devices 30) can be made immobile. Further, in an opening processing of the mouth portion of a bag B, by driving a corresponding pair of movable bodies 11 in such a manner that the bag B is flexed in accordance with the operation of an opening device (e.g., a suction cup or an air blower), the certainty of the opening processing can be improved.

Further, in a processing of introducing contents (e.g., contents containing solid materials) into the inside of a bag B, by driving a corresponding pair of movable bodies 11 in such a manner that the bag B is repeatedly placed in a bend state and a tensed state, the contents in the inner space of the bag B can be flattened. In a processing of introducing contents containing liquid into the inside of a bag B, by driving a corresponding pair of movable bodies 11 in such a manner that the mouth portion of the bag B is opened to the extent necessary and sufficient, the splashing of the liquid from the inside of the bag B to the outside can be reduced. Also, by driving a corresponding pair of movable bodies 11 in such a manner that the opening of the mouth portion of the bag B is sufficiently small (e.g., in such a manner that the mouth is closed) when the bag B that contains liquid inside is conveyed, the liquid can be prevented from spilling out of the bag B from the inside to the outside during the conveyance of the bag B.

In a degassing processing in which a gas inside a bag B is discharged to the outside, by driving a corresponding pair of movable bodies 11 in such a manner that the bag B is tensed, the degassing processing can be effectively performed. In a processing of introducing a gas, such as steam, into the inside of a bag B, by driving a corresponding pair of movable bodies 11 in such a manner that the bag B (in particular, the mouth portion) is tensed, it is possible to reduce the leakage of a gas from the inside of the bag B to the outside and to reduce the inflow of outside air from the outside of the bag B to the inside. In a sealing processing of sealing the mouth portion of a bag B, by driving a corresponding pair of movable bodies 11 in such a manner that the mouth portion is tensed and stretched tightly, wrinkles can be prevented from being given to the mouth portion by the sealing processing.

Figure 13:
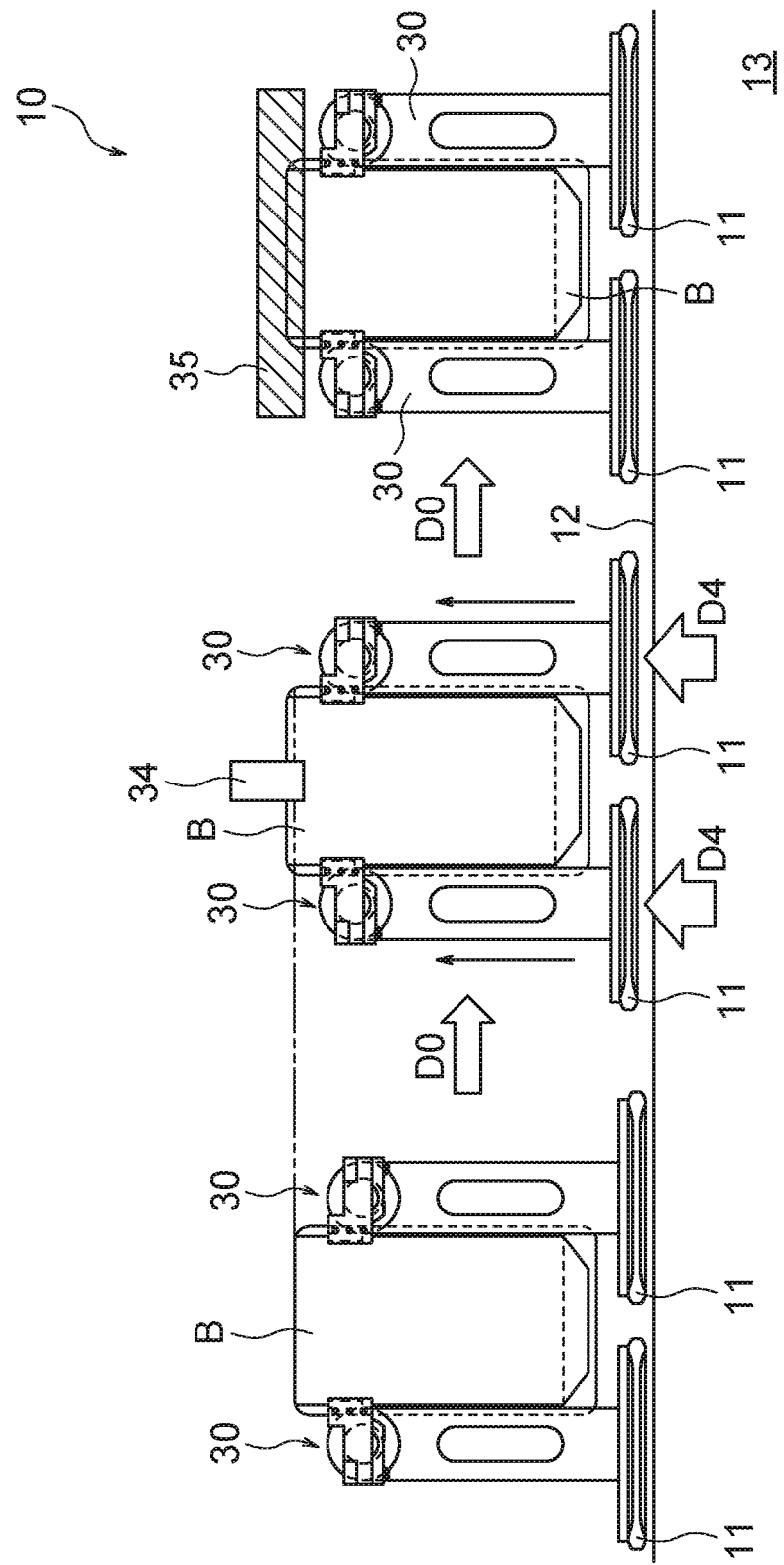
FIG. 13 is a side view showing another example of a conveyance system.

FIG. 13 is a side view showing another example of the conveyance system 10.

In the conveyance system 10 of the present example, under the control of the conveyance control unit 14 (see FIG. 1, etc.), in a state where two movable bodies 11 forming a pair are positioned at a sealing processing height position higher than a reference height position arranged during a normal movement, the sealing processing of the mouth portion of a bag B held by a pair of bag holding devices 30 mounted on these movable bodies 11 is performed.

The movement of each movable body 11 from the reference height position to the sealing processing height position (see arrows D4 (an upward direction) in FIG. 13) is performed by controlling the magnitude of the magnetic force acting between each movable body 11 and the conveyance body unit 13 by the conveyance control unit 14. The height position of a bag B is detected by a sensor 34 while the bag B is moving or stopped, and results of the detection are sent from the sensor 34 to the conveyance control unit 14. The conveyance control unit 14 can control the magnetism acting between each movable body 11 and the conveyance body unit 13 based on the feedback information about the height position of a bag B, so that the height position of each movable body 11 can be adjusted with high accuracy.

Since the height position of a bag B is required to be actively changed before the sealing process as described above, a sealing heat plate 35 can be pressed against a desired height position part of the mouth portion of a bag B at a sealing processing station, and consequently, the sealing processing can be performed with better positioning accuracy.

In a case where a sealing heat plate 35 is pressed against a bag B multiple times (i.e., multiple sealing processes are performed for a bag B) at one or more sealing processing stations, the height position of a bag B against which a sealing heat plate 35 is pressed may be shifted between sealing processes. For instance, in a first sealing process, a sealing heat plate 35 may seal an area of the mouth portion of a bag B from the top edge of the bag B to 9 mm below, and in the second sealing process, a sealing heat plate 35 may seal an area of the mouth portion of the bag B from the top edge of the bag B to 10 mm below. Further, in a case where a cooling plate (not shown in the drawings) is subsequently pressed against the mouth portion of a bag B, the area of a bag B against which the cooling plate is pressed may be changed from the area of the bag B against which a sealing heat plate 35 is pressed (e.g., the area of the mouth portion of a bag B from the top edge of the bag B to 11 mm below may be pressed by the cooling plate).

Figure 14:
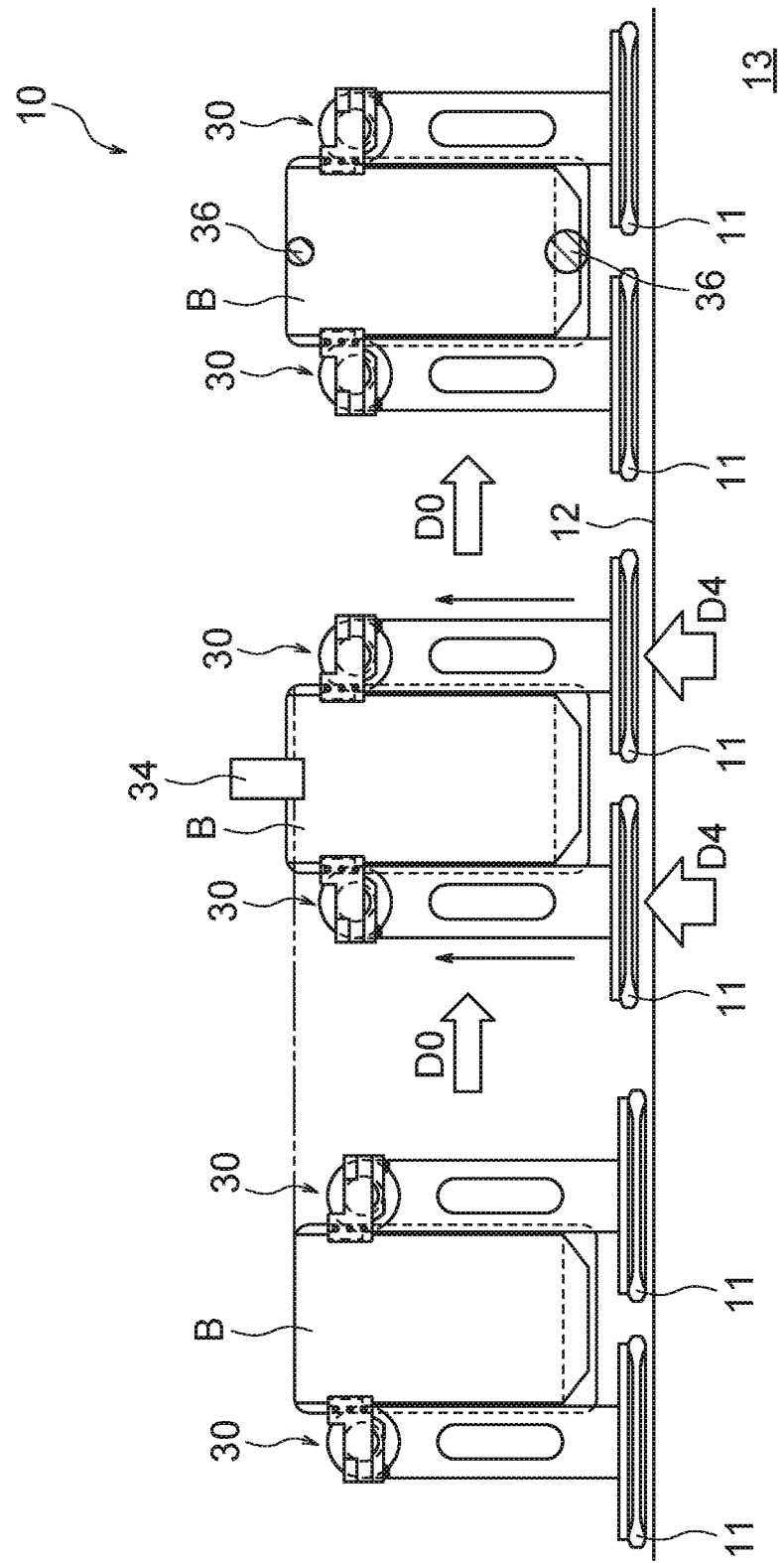
FIG. 14 is a side view showing another example of a conveyance system.

FIG. 14 is a side view showing another example of the conveyance system 10.

In the conveyance system 10 of the present example, under the control of the conveyance control unit 14, in a state where two movable bodies 11 forming a pair are positioned at an opening processing height position that is higher than the reference height position arranged during a normal movement, a mouth opening processing of the mouth portion of a bag B held by a pair of bag holding devices 30 mounted on these movable bodies 11 is performed.

The movement of each movable body 11 from the reference height position to the opening processing height position (see arrows D4 (an upward direction) in FIG. 14) is performed by controlling the magnitude of the magnetic force acting between each movable body 11 and the conveyance body unit 13 by the conveyance control unit 14. The height position of a bag B is detected by a sensor 34. The conveyance control unit 14 can precisely adjust the height position of each movable body 11 based on the feedback information about the height position of a bag B from the sensor 34.

By actively changing the height position of a bag B before the mouth opening processing in this manner, a desired height position portion of a bag B can be suctioned and supported by opening suckers 36 (in the example shown in FIG. 14, including an upper sucker that suctions and supports the mouth portion of a bag B and an lower sucker that suctions and supports the bottom portion of a bag B) at an opening processing station, and consequently, the certainty of the mouth opening processing can be improved.

As shown in FIGS. 13 and 14 described above, the height position of a bag B (and thus the height position of a corresponding pair of bag holding devices 30 and a corresponding pair of movable bodies 11) for processing the bag B (e.g., a sealing processing, an opening processing, etc.) may be differentiated from the height position of a bag B (and thus the height position of a corresponding pair of bag holding devices 30 and a corresponding pair of movable bodies 11) during the time when those processes are not performed (e.g. while a bag B is being conveyed). This makes it possible, even if there are variations in a relative height position between a bag B and bag holding devices 30, to reduce differences of the variations in such a height position by a height position adjustment processing of each movable body 11 performed prior to a desired processing. As a result, various processes (a sealing processing, an opening processing, etc.) can be performed on a bag B in a state where the bag B is precisely positioned at a desired height position.

Figure 15:
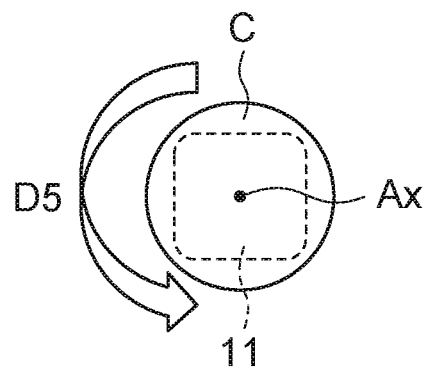
FIG. 15 is a plan view showing an example of a driving configuration of a movable body.

FIG. 15 is a plan view showing an example of a driving configuration of a movable body 11. A movable body 11 in the present example is rotated in a rotation direction D5 and in an opposite direction of the rotation direction D5 around a rotation axis Ax under the control of the conveyance control unit 14 (see FIG. 1, etc.) to agitate contents (not shown) contained in a container C (such as a can) that is placed on the movable body 11. The rotation axis Ax may or may not coincide with the central axes of a movable body 11 and a container C.

Figure 16:
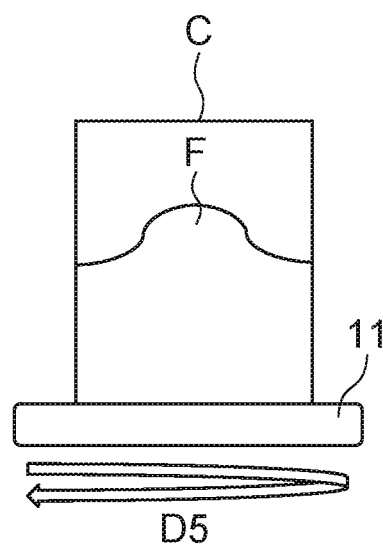
FIG. 16 is a side view showing another example of a driving configuration of a movable body.
Figure 17:
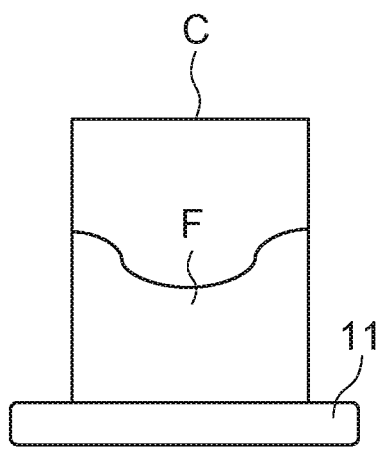
FIG. 17 is a side view showing another example of a driving configuration of a movable body.

FIGS. 16 and 17 are side views showing other examples of the driving configuration of a movable body 11. FIGS. 16 and 17 show a state of contents F inside a container C in a see-through manner. A movable body 11 in the present example rotates in the rotation direction D5 under the control of the conveyance control unit 14 (see FIG. 1, etc.) to change a raised state of contents F inside a container C that is placed on the movable body 11.

Generally, in a case where contents F with poor fluidity is introduced into the inside of a container C, the contents F are contained in the container C often in a state where the contents F are locally raised in the center of the container C. Therefore, by rotating a movable body 11 as in the present example, contents F in a container C rotating along with the movable body 11 receive centrifugal force, and as a result, the contents F are shaped into a state where the contents F are locally recessed in the center of the container C (in other words, a state where the contents F are locally raised near the inner wall surface of the container C). This makes it possible to effectively use of a space inside a container C, and thus to prevent contents F from overflowing from the container C due to a localized rising of the contents F.

Figure 18:
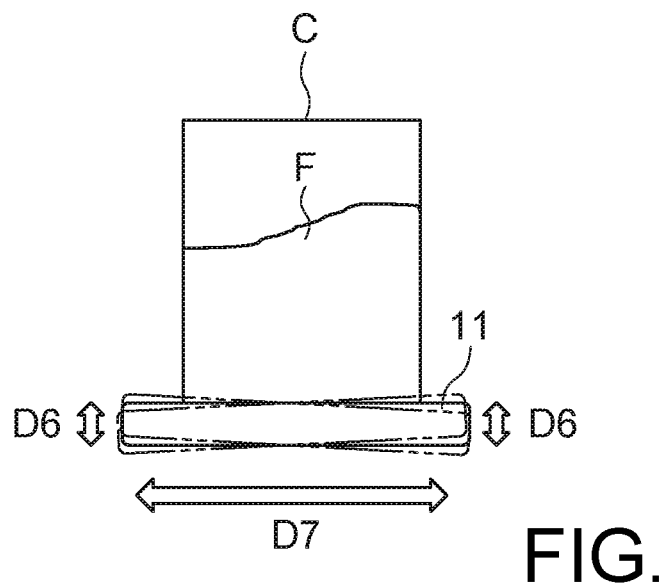
FIG. 18 is a side view showing another example of a driving configuration of a movable body.
Figure 19:
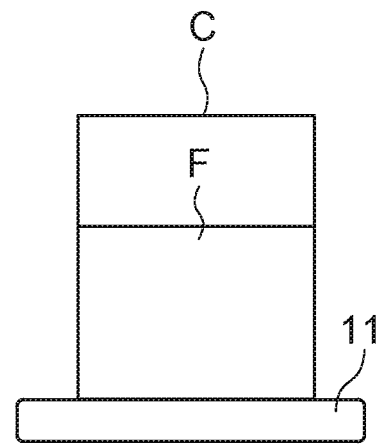
FIG. 19 is a side view showing another example of a driving configuration of a movable body.

FIGS. 18 and 19 are side views showing another example of the driving configuration of a movable body 11. FIGS. 18 and 19 show contents F inside a container C in a see-through manner. A movable body 11 in the present example vibrates in a vertical vibration direction D6 and/or a horizontal vibration direction D7 under the control of the conveyance control unit 14 (see FIG. 1, etc.), so that contents F inside a container C that is placed on the movable body 11 are flattened. The vertical vibration direction D6 corresponds to the height direction and the horizontal vibration direction D7 corresponds to a horizontal direction. When a movable body 11 is vibrated in the vertical vibration direction D6, the movable body 11 may momentarily take on a tilting posture at various tilting angles. This makes it possible to use the space inside a container C effectively, and thus to prevent overflow of contents F from the container C due to localized rising of the contents F.

Figure 20:
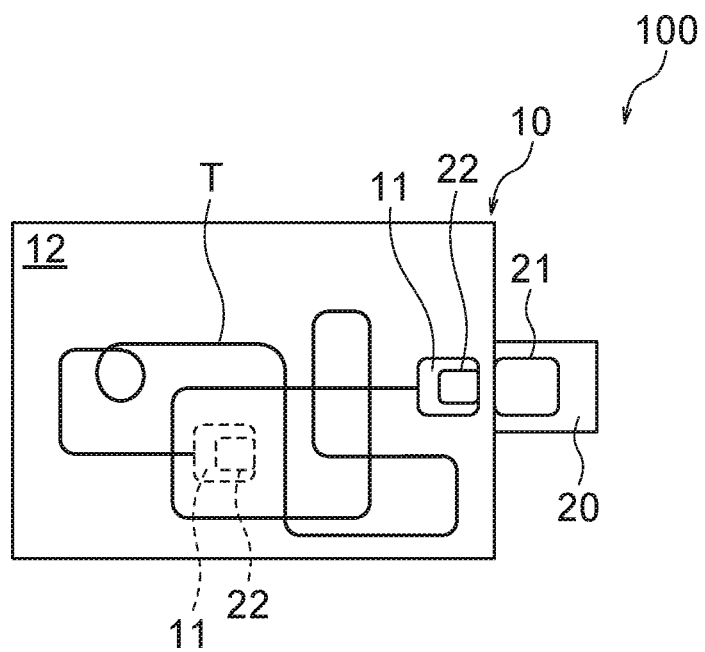
FIG. 20 is a plan view showing another example of a processing system.

FIG. 20 is a plan view showing another example of the processing system 100.

In the processing system 100 of the present example, a power source device 22 is placed on a movable body 11. The power source device 22 moves two-dimensionally along the conveyance surface 12 along with the movable body 11 (see a movement trajectory T shown in FIG. 20), and can be connected to a processing device battery 21 of a processing device 20 provided around the conveyance surface 12 to charge the processing device battery 21.

The power source device 22 can take any battery form (e.g., a solar cell form) that can supply power to the processing device battery 21.

Although the power source device 22 in the present example takes the form of a battery, the power source device 22 can take any other form of power source (such as forms of electric power, magnetism, elasticity force, thermal energy, and light source, etc.), and for instance, a wireless switch (as an example, a wireless switch that requires no power source because electromotive force is generated by button action) and/or a magnet may be mounted on the power source device 22.

Further, although only one movable body 11 on which a power source device 22 is mounted is shown in FIG. 20, multiple power source devices 22 may be mounted on multiple movable bodies 11 respectively and be provided to be able to move independently of each other along the conveyance surface 12.

In the example shown in FIG. 20, a power source device 22 is mounted on a movable body 11 and is provided to be movable, but a processing device 20 comprising a processing device battery 21 may be mounted on a movable body 11 and be provided to be movable. For instance, a movable body 11 carrying a processing device 20 may be moved along the conveyance surface 12 as needed to connect the processing device battery 21 of the processing device 20 to a power source device 22 that is fixedly installed around the conveyance surface 12, so that the processing device battery 21 may be charged.

Figure 21:
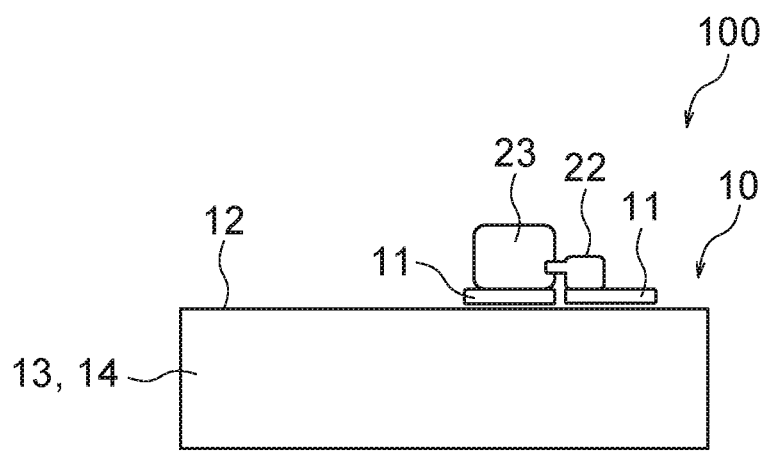
FIG. 21 is a side view showing another example of a processing system.

FIG. 21 is a side view showing another example of the processing system 100.

In the processing system 100 of the present example, a power source device 22 is placed on a movable body 11 and a drive source device 23 is placed on another movable body 11. The power source device 22 and the drive source device 23 move two-dimensionally along the conveyance surface 12 along with the corresponding movable bodies 11. The drive source device 23 can perform processing at any position within the range of the conveyance surface 12. The power source device 22 can be connected to a processing device (not shown) and/or the drive source device 23 for charging, if necessary, at any position within the range of the conveyance surface 12.

Figure 22:
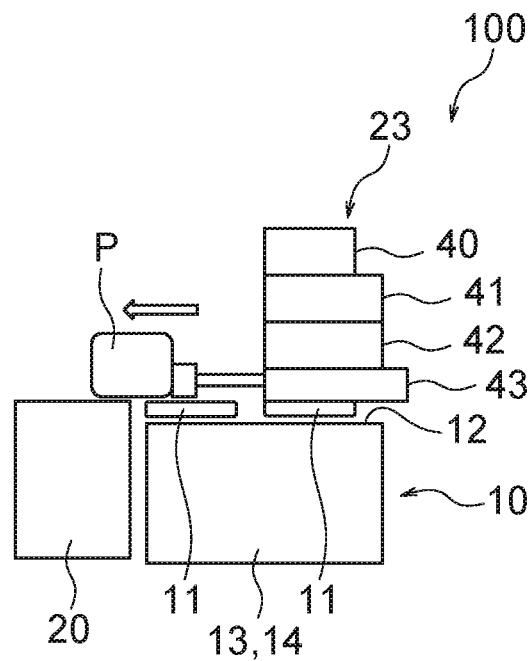
FIG. 22 is a side view showing another example of a processing system.

FIG. 22 is a side view showing another example of the processing system 100.

In the processing system 100 of the present example, an article P that is an object to be processed in a processing device 20 is placed on a movable body 11, and a drive source device 23 is placed on another movable body 11.

The drive source device 23 in the present example includes a communication device 40, a sensor 41, an electromagnetic valve 42 and a cylinder 43. The communication device 40 communicates wirelessly or wired with the conveyance control unit 14 (see FIG. 1, etc.) and any other device to transmit and receive data. The data transmitted and received by the communication device 40 is not limited. The communication device 40 can, for example, receive detection results of the sensor 41 and transmit drive signals for the electromagnetic valve 42 and the cylinder 43. The sensor 41 may detect any state quantity and may determine, for example, a state quantity related to an article P (e.g., the distance to an article P). Electromagnetic valve 42 may be driven in response to a drive signal received via the communication device 40. The cylinder 43 comprises a rod of which the amount of protrusion in a horizontal direction can change and may be driven to vary the protrusion amount of the rod in response to a drive signal received via the communication device 40. The specific structure and the driving configuration of the cylinder 43 is not limited, and the cylinder 43 can be configured by an air cylinder or an electric cylinder, for example.

In a state where a movable body 11 on which a drive source device 23 is placed and a movable body 11 on which an article P is placed are positioned close to each other, by increasing the protrusion amount of the rod of the cylinder 43, the article P is pushed and moved from the movable body 11 to a processing device 20 by the rod.

Figure 23:
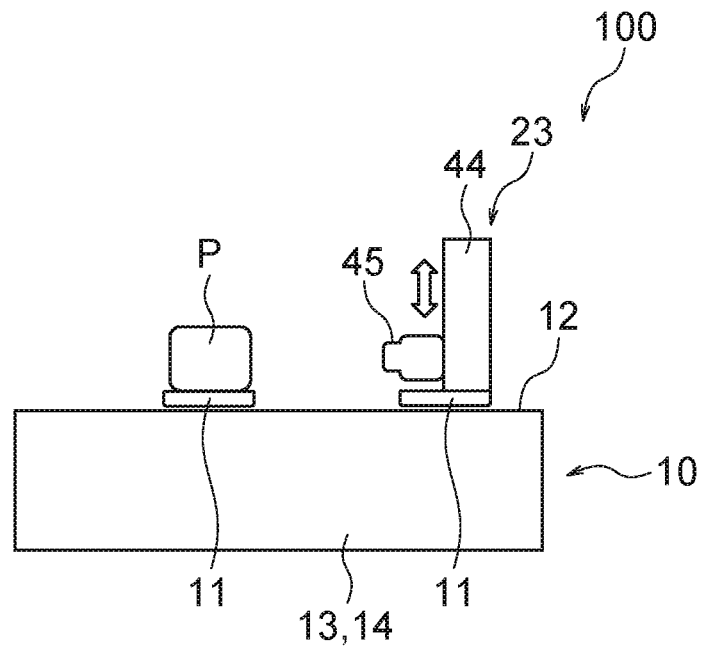
FIG. 23 is a side view showing another example of a processing system.

FIG. 23 is a side view showing another example of the processing system 100.

In the processing system 100 of the present example, an article P that is an object to be processed in the processing system, is placed on a movable body 11, and a drive source device 23 is placed on another movable body 11. However, the drive source device 23 includes a servo mechanism 44 and an imaging device 45. The servo mechanism 44 moves the imaging device 45 in the height direction to position it at an arbitrary height position. The imaging device 45 takes images at any height position arranged by the servo mechanism 44.

For instance, while the imaging device 45 is being moved in the height direction by the servo mechanism 44, images (still images and/or a video) of an article P may be captured by the imaging device 45. By analyzing the captured images of an article P acquired in this manner, it is also possible to inspect the condition of the article P (e.g., presence or absence of scratches or other abnormalities in the article P (workpiece, etc.)).

The drive source device 23 in the present example may include a communication device 40, a sensor 41, an electromagnetic valve 42 and/or a cylinder 43 shown in FIG. 22 described above, and/or any other device.

Figure 24:
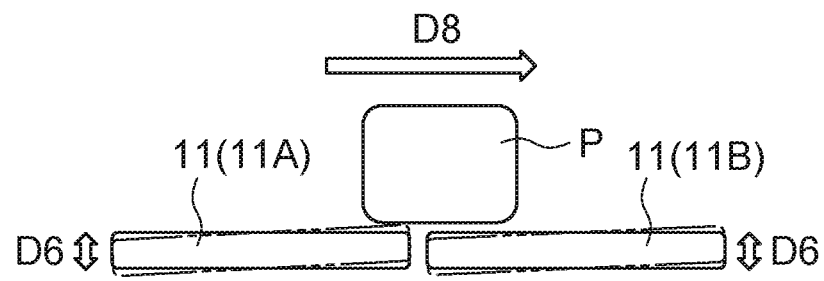
FIG. 24 is a side view showing another example of a driving configuration of a movable body.

FIG. 24 is a side view showing another example of the driving configuration of movable bodies 11.

In the present example, an article P is transferred between movable bodies 11 by vibrating the movable bodies 11 in the vertical vibration direction D6 (in particular, by vibrating the movable bodies 11 while changing momentary tilting postures of the movable bodies 11). Further, an article P may be transferred between movable bodies 11 by pushing the article P on one movable body 11 onto another movable body 11 by a pushing member (not shown in the drawings) such as a rod of a cylinder 43 shown in FIG. 22 described above. Preferably, the position and posture of each movable body 11 are adjusted in such a manner that the transfer of an article P between the movable bodies 11 is smoothly carried out. For instance, an article P may be transferred from a transfer departure source movable body 11A in an article movement direction D8 in a state where the height position of the transfer departure source movable body 11A (in particular, the height position of the article placing surface (i.e., the top surface) of the end of the transfer departure source movable body 11A on a transfer destination movable body 11B side) is higher than the height position of the transfer destination movable body 11B (in particular, the height position of the article placing surface (i.e., the top surface) of the end of the transfer destination movable body 11B on a transfer departure source movable body 11A side). Further, an article P may be transferred in the article movement direction D8 from a transfer departure source movable body 11A to be placed onto a transfer destination movable body 11B by vibrating a movable body 11 (the transfer departure source movable body 11A and/or the transfer destination movable body 11B) in the vertical vibration direction D6 in a state where the movable body 11 is tilted in such a manner that the article placing surface of the movable body 11 is gradually lowered toward the article movement direction D8.

Figure 25:
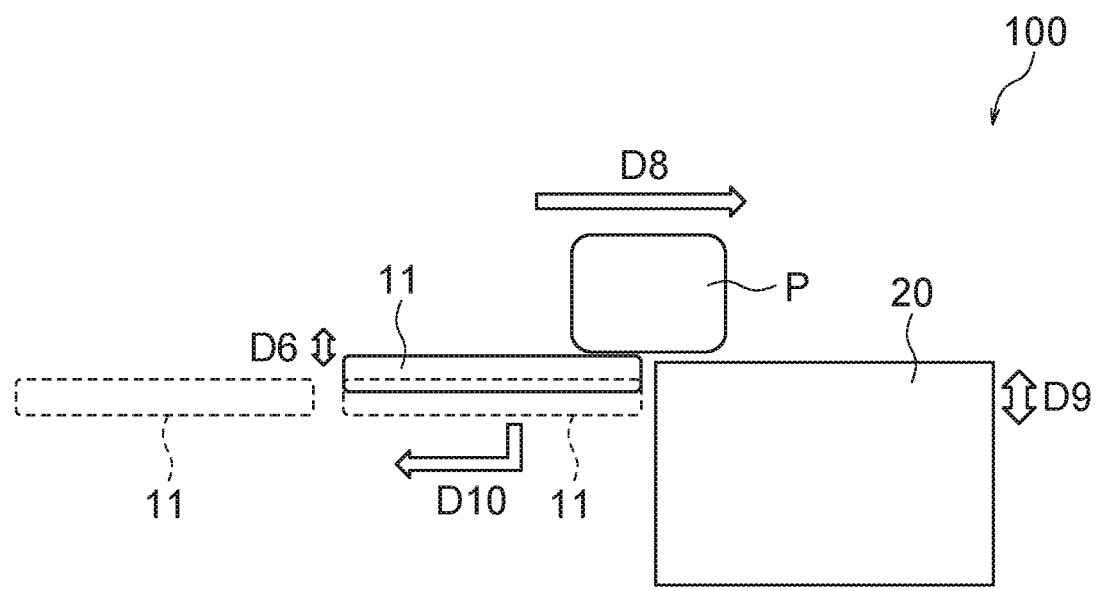
FIG. 25 is a side view showing another example of a driving configuration of a movable body.

FIG. 25 is a side view showing another example of the driving configuration of a movable body 11.

In the present example, by vibrating a movable body 11 in the vertical vibration direction D6 (in particular, by vibrating a movable body 11 while changing the momentary tilting posture of the movable body 11), an article P is transferred from the movable body 11 to a processing device 20 (such as a weighing device). Further, an article P may be transferred from a movable body 11 to a processing device 20 by pushing the article P on the movable body 11 toward the processing device 20 with a pushing member (not shown in the drawings) such as a rod of a cylinder 43 shown in FIG. 22 described above. Preferably, the position and posture of each movable body 11 is adjusted to ensure an article P to be transferred smoothly. For instance, in a state where the height position of the article placing surface (i.e., the top surface) of a movable body 11 (in particular, the height position of the article placing surface of the movable body 11 at the end on a processing device 20 side) is higher than the height position of the article placing surface (i.e., the top surface) of a processing device 20 (in particular, the height position of the article placing surface of the processing device 20 at the end on a movable body 11 side), an article P may be transferred from the movable body 11 in the article movement direction D8 to be placed on the processing device 20. Further, an article P may be moved from a movable body 11 to a processing device 20 in the article movement direction D8 to be placed on the processing device 20 by vibrating the movable body 11 in the vertical vibration direction D6 in a state where the movable body 11 is tilted in such a manner that the article placing surface of the movable body 11 is gradually lowered in the article movement direction D8.

The transfer of an article P from a movable body 11 to a processing device 20 may be done solely using the vibration of the movable body 11 or may be done using the vibration of both the movable body 11 and the processing device 20. For instance, first, an article P may be moved from a movable body 11 toward a processing device 20 by vibrating only the movable body 11, and then by vibrating the processing device 20 in the height direction (a processing device vibration direction D9) in a state where a part of the article P is being placed on the processing device 20 (in particular, by vibrating the processing device 20 while the momentary tilting posture of the processing device 20 is changed), the article P may be moved in such a manner that the entire article P is placed on the processing device 20. In this case, after a part of the article P is placed on the processing device 20 but before the entire article P is placed on the processing device 20, the movable body 11 may move in an evacuation direction D10 to be away from the article P. This allows the movable body 11 to move for a next processing before the transferring of the article P to the processing device 20 is completed, thereby improving the efficiency of the use of the movable body 11. According to the evacuation direction D10 shown in FIG. 25, a movable body 11 moves downward and after that, moves in a horizontal direction to be away from an article P, but the specific direction of the evacuation direction D10 (that is, the specific evacuation behavior of a movable body 11) is not limited.

In a case where an article P is moved from a movable body 11 by a pushing member (not shown in the drawings) such as a rod of a cylinder 43 shown in FIG. 22 described above, the article P may be moved from the movable body 11 in a state where the movable body 11 is held by a holding mechanism (not shown in the drawings). In this case, even if the movable body 11 receives force from the article P due to friction, etc., unintended movement of the movable body 11 can be prevented and the article P can be moved appropriately from the movable body 11.

Figure 26:
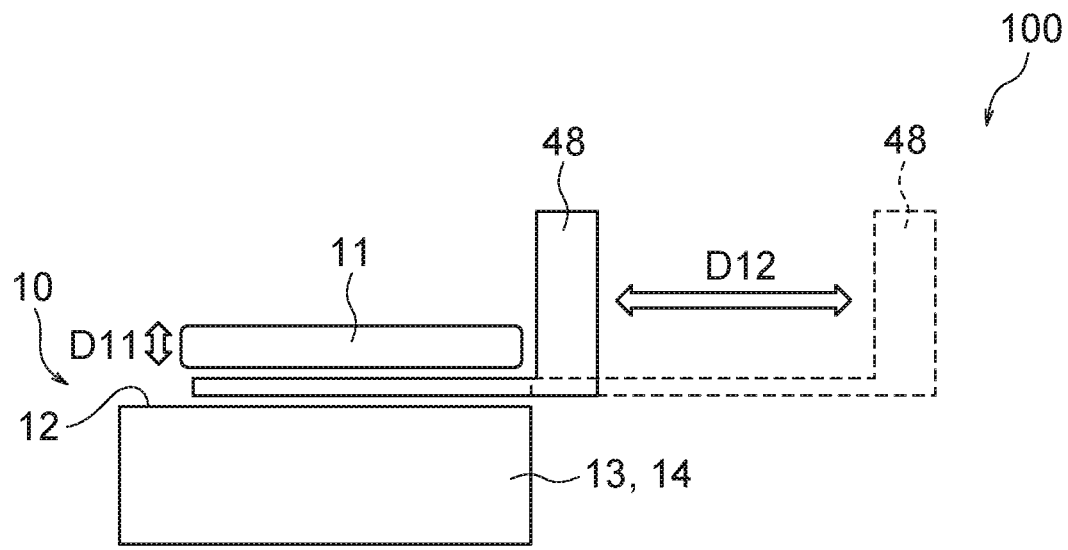
FIG. 26 is a side view showing another example of a processing system.

FIG. 26 is a side view showing another example of the processing system 100.

In the processing system 100 of the present example, a movable body 11 is transferred by a transfer device 48 and is moved to a processing device (not shown in the drawings) or the like. A movable body 11 may be loaded with nothing as shown in FIG. 26 or may be loaded with any item (not shown in the drawings).

In the present example, the transfer device 48 is moved in a device movement direction D12 under the control of a control device (not shown in the drawings), and a part of the transfer device 48 is inserted into a space between a movable body 11 and the conveyance surface 12. In this state, the conveyance control unit 14 controls the magnetism acting between the movable body 11 and the conveyance body unit 13 in such a manner that the movable body 11 is lowered (see an ascending/descending direction D11 in FIG. 26) to be placed on the transfer device 48. After that, the transfer device 48 on which the movable body 11 is being placed is moved in the device movement direction D12, and the movable body 11 is passed from the transfer device 48 to a processing device (not shown in the drawings).

In order to return a movable body 11 from a processing device to above the conveyance surface 12, the sequence of processing steps described above is performed in reverse order.

The control device that controls the movement of the transfer device 48 may be the conveyance control unit 14 or may be a device different from the conveyance control unit 14. In a case where this control device and the conveyance control unit 14 are different devices, signals may be sent and received between the control device and the conveyance control unit 14 to share information, and the control device and the conveyance control unit 14 may be configured in such a manner that respective objects (i.e., the transfer device 48 and each movable body 11) to be controlled by the control device and the conveyance control unit 14 work in collaboration.

Figure 27:
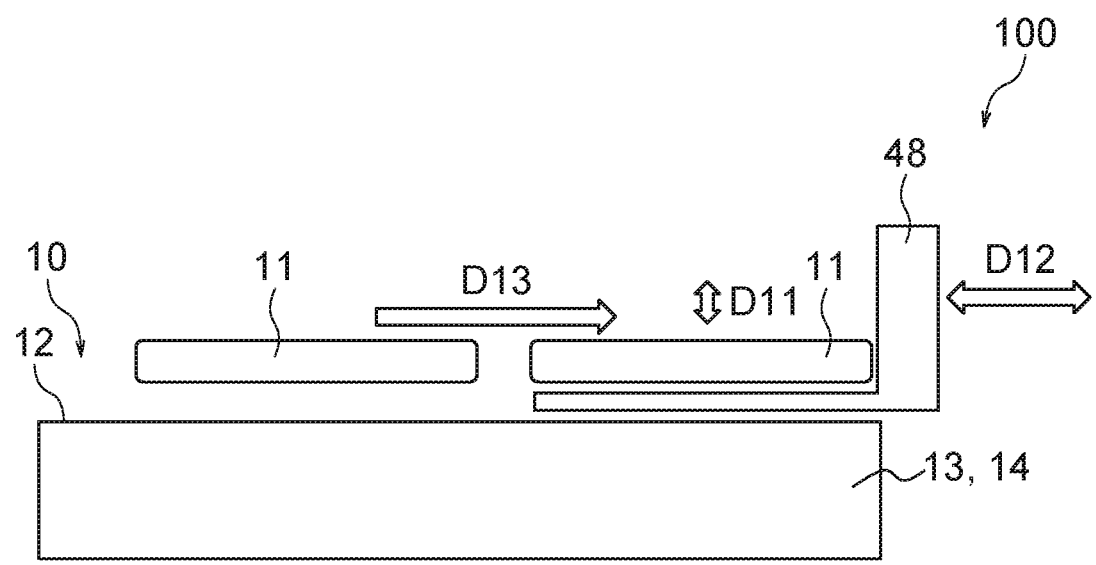
FIG. 27 is a side view showing another example of a processing system.

FIG. 27 is a side view showing another example of the processing system 100.

In the processing system 100 of the present example, a movable body 11 is transferred by the transfer device 48 and is moved to a processing device (not shown in the drawings) or the like. A movable body 11 may be loaded with nothing or may be loaded with any item (not shown in the drawings).

In the present example, the transfer device 48 is moved in the device movement direction D12 under the control of the control device (not shown in the drawings), so that at least part of the transfer device 48 is positioned above the conveyance surface 12. In this state, a movable body 11 is moved in a horizontal movement direction D13 under the control of the conveyance control unit 14, so that the movable body 11 is positioned on the opposite side from the conveyance surface 12 via a part of the transfer device 48. Specifically, a part of the transfer device 48 is positioned between the movable body 11 and the conveyance surface 12. After that, by controlling the magnetism acting on the movable body 11 under the control of the conveyance control unit 14, the movable body 11 is lowered (see FIG. 27, the ascending/descending direction D11) to be placed on the transfer device 48. After that, the transfer device 48 on which the movable body 11 is being placed is moved in the device movement direction D12 and the movable body 11 is passed from the transfer device 48 to a processing device (not shown in the drawings).

In order to return a movable body 11 from a processing unit to above the conveyance surface 12, the series of processing steps described above are performed in reverse order.

In the examples shown in FIGS. 26 and 27 described above, the position (e.g., the height position) and the posture (e.g., an inclined posture) of a movable body 11 may be adjusted properly in such a manner that the movable body 11 is smoothly placed on the transfer device 48. As a mechanism for holding a movable body 11, a device to pinch the movable body 11 and/or a device using suction and/or magnetic force may be provided.

[Processing System]

Figure 28:
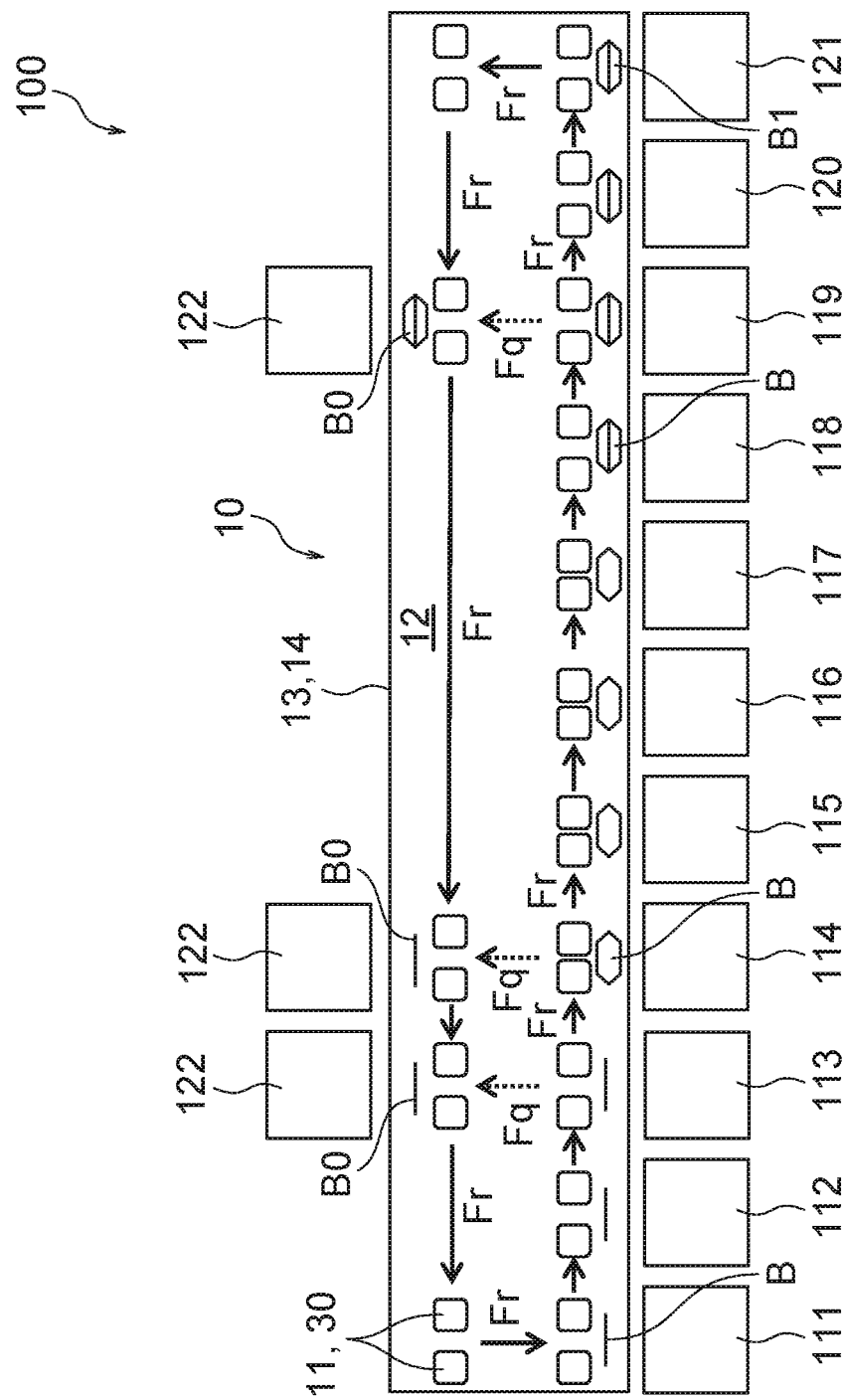
FIG. 28 is a plan view showing another example of a processing system.

FIG. 28 is a plan view showing another example of the processing system 100.

The conveyance surface 12 in the present example has a rectangular shape demarcated by two long sides and two short sides. Along one long side of the conveyance surface 12, a plurality of processing devices that perform packaging-related processes for bags are installed. Specifically, a bag feeding device 111, a printing device 112, a printing inspection device 113, a mouth opening device 114, a solid introduction device 115, a liquid filling device 116, a degassing device 117, a first seal heating device 118, a second seal heating device 119, a seal cooling device 120 and a good product release device 121 are installed as the plurality of processing devices. Further, along the other long side of the conveyance surface 12, a plurality (three) of defective bag discharging devices 122 for discharging defective bags B0 are installed as processing devices. In the example shown in FIG. 28, these three defective bag discharging devices 122 are positioned on opposite sides, via the conveyance surface 12 (the conveyance body unit 13), from the printing inspection device 113, the mouth opening device 114 and the second seal heating device 119, respectively.

A bag holding device 30 (see FIGS. 6 through 14) is fixedly placed on each movable body 11. A bag B is held by a pair of bag holding devices 30 mounted on two movable bodies 11 that form a pair and move along the conveyance surface 12 along with the corresponding pair of movable bodies 11. A pair of movable bodies 11 moving along with a bag B in the example shown in FIG. 28 moves, during a normal processing, along a rectangular normal travel route Fr along the outer circumference of the conveyance surface 12. On the other hand, if an abnormality is detected in a bag B during a series of processes, a pair of movable bodies 11 moving along with the bag B moves along a defective bag discharging route Fq, which deviates from the normal travel route Fr, to a defective bag discharging station where a defective bag discharging device 122 is installed.

Each pair of movable bodies 11 may be rotated 180 degrees along the horizontal plane when moving from one to the other of a normal travel route Fr along one long side of the conveyance surface 12 and a normal travel route Fr along the other long side. In this case, the orientation of a pair of bag holding devices 30 mounted on a pair of movable bodies 11 is adjusted to change 180 degrees along the horizontal plane, so that a pair of bag holding devices 30 and a bag B are positioned in a position suitable for processing by a processing device (i.e., a position near a processing device) at each processing station.

Each pair of movable bodies 11 stops intermittently and sequentially at a plurality of processing stations on the normal travel route Fr. Specifically, each pair of movable bodies 11 stops intermittently at a bag feeding station, a printing station, a printing inspection station, a mouth opening station, a solid introduction station, a liquid filling station, a degassing station, a first seal heating station, a second seal heating station, a seal cooling station and a good product release station.

At each processing station, various processes are performed by corresponding processing devices while each pair of movable bodies 11 is being intermittently stopped. At the bag feeding station, the bag feeding device 111 provides a bag B (in the example shown in FIG. 28, an empty flat bag) to a pair of bag holding devices 30 mounted on a pair of movable bodies 11 located at the bag feeding station. At the printing station, the printing device 112 performs a printing process on a bag B to impart a printed indication of various information to the bag B.

At the printing inspection station, the printing inspection device 113 inspects the printing condition of a bag B, and results of the inspection are transmitted from the printing inspection device 113 to the conveyance control unit 14. If, as a result of the inspection, no abnormality is found in the printing condition of a bag B, a pair of movable bodies 11, a pair of bag holding devices 30 and the bag B move to a later processing station (i.e., the mouth opening station) along the normal travel route Fr under the control of the conveyance control unit 14. On the other hand, if an abnormality is found in the printing condition of a bag B as a result of the inspection, a corresponding pair of movable bodies 11 and a corresponding pair of bag holding devices 30 move, along with the bag B, to a corresponding defective bag discharging station along a defective bag discharging route Fq under the control of the conveyance control unit 14.

At the mouth opening station, the mouth opening device 114 opens the mouth portion of a bag B. At the mouth opening station, a mouth opening detection device that determines an opening state of the mouth portion of a bag B is provided, and results of the determination is transmitted from the mouth opening detection device to the conveyance control unit 14. The mouth opening detection device may comprise a dedicated sensor or another device (not shown in the drawings), or the mouth opening device 114 may also serve as the mouth opening detection device. If a determination result of the mouth opening detection device indicates that the mouth portion of a bag B is properly opened, a pair of movable bodies 11, a pair of bag holding devices 30 and a bag B move to a later processing station (i.e., the solid introduction station) along the normal travel route Fr under the control of the conveyance control unit 14. On the other hand, if a determination result of the mouth opening detection device indicates that the mouth portion of a bag B is not properly opened, a corresponding pair of movable bodies 11 and a pair of bag holding devices 30 move, along with the bag B, to a corresponding defective bag discharging station along a defective bag discharging route Fq under the control of the conveyance control unit 14.

At the solid introduction station, the solid introduction device 115 introduces solids (contents) into a bag B through the mouth portion in an open state. At the liquid filling station, the liquid filling device 116 injects a liquid (contents) into a bag B through the mouth portion in an open state. At the degassing station, the degassing device 117 discharges gas (e.g., gas containing oxygen, such as air) in the bag B out of the bag B through the mouth portion in an open state. The degassing device 117 may expel air and other gases from a bag B by introducing steam (water vapor) into the bag B, for example.

At the first seal heating station and the second seal heating station, the first seal heating device 118 and the second seal heating device 119 heat-seal the mouth portion of a bag B, respectively.

In the second seal heating station, a seal state detection device that detects the seal state of a bag B is provided, and the results of the detection are transmitted from the seal state detection device to the conveyance control unit 14. The seal state detection device may comprise a device such as a dedicated sensor (not shown in the drawings) or the second seal heating device 119 may also serve as the seal state detection device. If a detection result of the seal state detection device indicates that the mouth portion of a bag B has been properly sealed, a pair of movable bodies 11, a pair of bag holding devices 30 and the bag B move along the normal travel route Fr to a later processing station (i.e., the seal cooling station) under the control of the conveyance control unit 14. On the other hand, if a detection result of the seal state detection device indicates that the mouth portion of a bag B is not properly sealed, a corresponding pair of movable bodies 11 and a corresponding pair of bag holding devices 30, together with the bag B in question, move to a corresponding defective bag discharging station along a defective bag discharging route Fq under the control of the conveyance control unit 14.

At the seal cooling station, the seal cooling device 120 cools the mouth portion of a bag B (in particular, a heat-sealed portion). At the good product release station, the good product release device 121 receives a product bag B1 (i.e., a bag B which accommodates contents and has a sealed mouth portion) from a pair of movable bodies 11 and sends it to a later stage.

After releasing a bag B (a product bag B1) at the good product release station, a pair of movable bodies 11 moves on a normal travel route Fr along one short side of the conveyance surface 12, and then on a normal travel route Fr along the other long side of the conveyance surface 12.

The above-described three defective bag discharging stations are located on a normal travel route Fr along the other long side of the conveyance surface 12. At each defective bag discharging station, a corresponding defective bag discharging device 122 collects a defective bag B0 (i.e., a bag B in which an abnormality is detected) from a pair of bag holding devices 30. A pair of movable bodies 11 and a corresponding pair of bag holding devices 30 move on a normal travel route Fr along the other long side of the conveyance surface 12 immediately after releasing a bag B (i.e., a defective bag B0) at the defective bag discharging station.

Each pair of movable bodies 11 moves, from the end point of a normal travel route Fr along the other long side of the conveyance surface 12, onto a normal travel route Fr along the other short side of the conveyance surface 12, and then moves again onto a normal travel route Fr along one long side of the conveyance surface 12.

Figure 29:
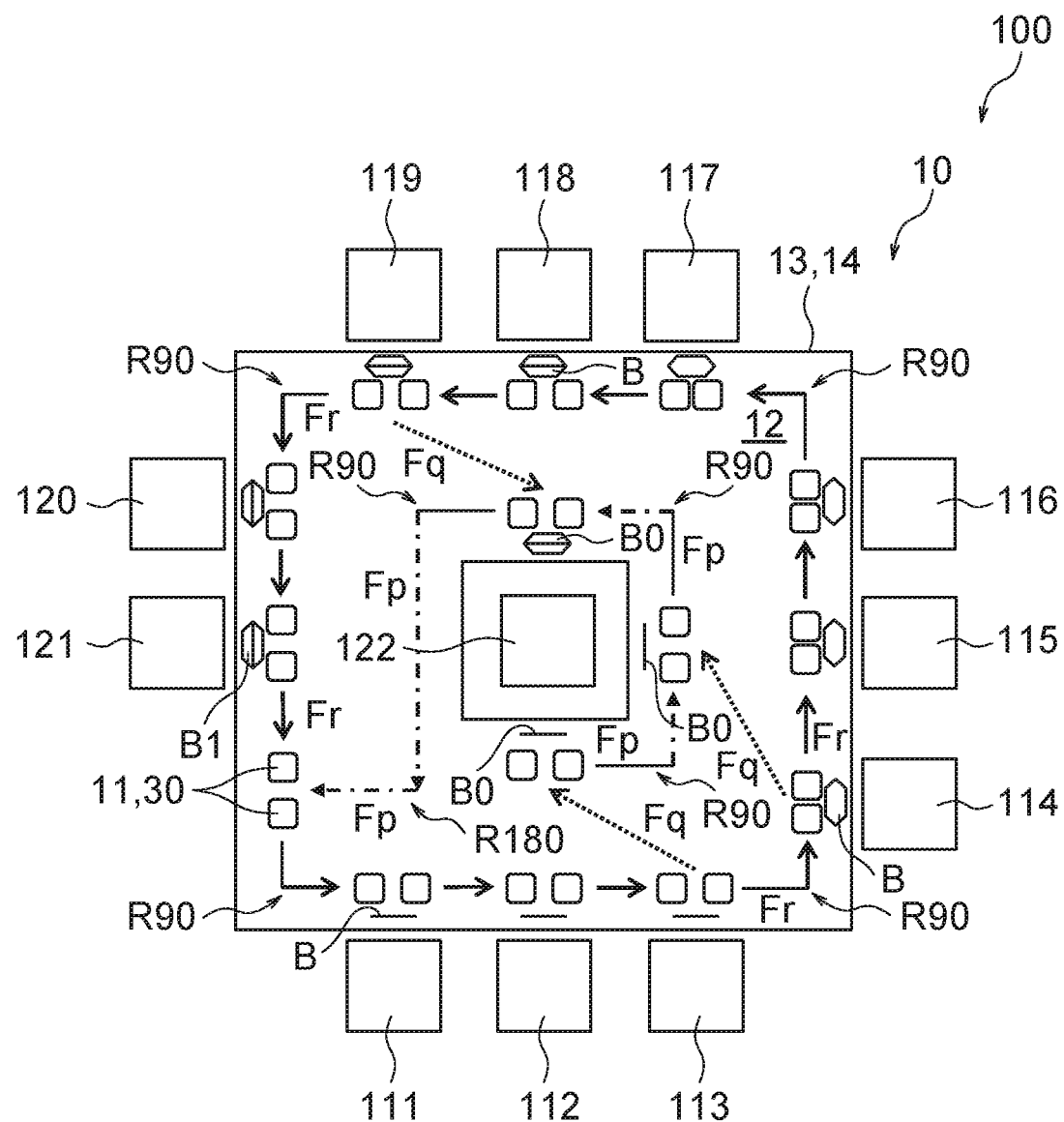
FIG. 29 is a plan view showing another example of a processing system.

FIG. 29 is a plan view showing another example of the processing system 100.

The processing system 100 of the present example comprises processing equipment that performs the same packaging-related processing as the processing system 100 shown in FIG. 28 described above, but the bag feeding device 111 to the good product release device 121 (i.e., the devices denoted by reference numerals 111 through 121) are installed along the outer circumference of the conveyance surface 12, while the defective bag discharging device 122 is installed inside the conveyance surface 12.

The conveyance surface 12 shown in FIG. 29 has a quadrangle ring shape having an outer perimeter with a quadrangular shape (in particular, a square shape) and an inner perimeter with a quadrangular shape (in particular, a square shape). The bag feeding device 111 through the good product release device 121 are provided in an area outside of the conveyance surface 12, and the defective bag discharging device 122 is provided in an inner area enclosed by the conveyance surface 12.

Therefore, the bag feeding station, the printing station, the printing inspection station, the mouth opening station, the solid introduction station, the liquid filling station, the degassing station, the first seal heating station, the second seal heating station, the seal cooling station and the good product release station are provided, in sequence, in the outer periphery area of the conveyance surface 12 (in particular, in the area near corresponding processing devices (i.e., the bag feeding device 111 to the good product release device 121)). Thus, the normal travel route Fr on which each movable body 11 moves while a normal processing is performed (i.e., the normal travel route Fr passing through the bag feeding station to the good product release station) is a circulation route having a quadrangular shape (in particular, a square shape) extending along the outer circumference of the conveyance surface 12.

On the other hand, defective bag discharging stations are provided in the inner circumference area of the conveyance surface 12 (in particular, in the area near the defective bag discharging device 122). In the example shown in FIG. 29, three defective bag discharging stations are provided near three of the four sides that form the inner circumference of the conveyance surface 12, respectively. A pair of bag holding devices 30 holding a defective bag B0 and a pair of movable bodies 11 go through a defective bag discharging route Fq to reach these three defective bag discharging stations from the printing inspection station where the printing inspection device 113 is installed, the mouth opening station where the mouth opening device 114 is installed, and the second seal heating station where the second seal heating device 119 is installed, respectively.

As described above, the three defective bag discharging stations in the present example are not located on the normal travel route Fr. Therefore, a pair of movable bodies 11 returns to the normal travel route Fr through a return route Fp after releasing a bag B (i.e., a defective bag B0) at a defective bag discharging station. The return route Fp shown in FIG. 29 includes a route along the inner circumference of the conveyance surface 12 and terminates at a vacant station between the good product release station where the good product release device 121 is provided and the bag feeding station where the bag feeding device 111 is provided. A pair of movable bodies 11 and a pair of bag holding devices 30 that have released a bag B (i.e., a defective bag B0) at a defective bag discharging station move to the vacant station through the return route Fp and then move from the vacant station to the bag feeding station along the normal travel route Fr.

Each pair of movable bodies 11 rotates properly in such a manner that a pair of bag holding devices 30 and a bag B are arranged in a position suitable for processing (a position near a processing device) at each processing station. For instance, in parts of the normal travel route Fr and the return route Fp where the route direction changes by 90 degrees (i.e., four corner parts of the normal travel route Fr; three corner parts of the return route Fp along the inner circumference of the conveyance surface 12; see reference sign "R90" in FIG. 29), each pair of movable bodies 11 rotates 90 degrees along the horizontal plane. Also, in the part of the return route Fp where the route direction changes toward the vacant station (see reference sign "R180" in FIG. 29) and in the defective bag discharging route Fq, each pair of movable bodies 11 rotates 180 degrees along the horizontal plane.

Figure 30:
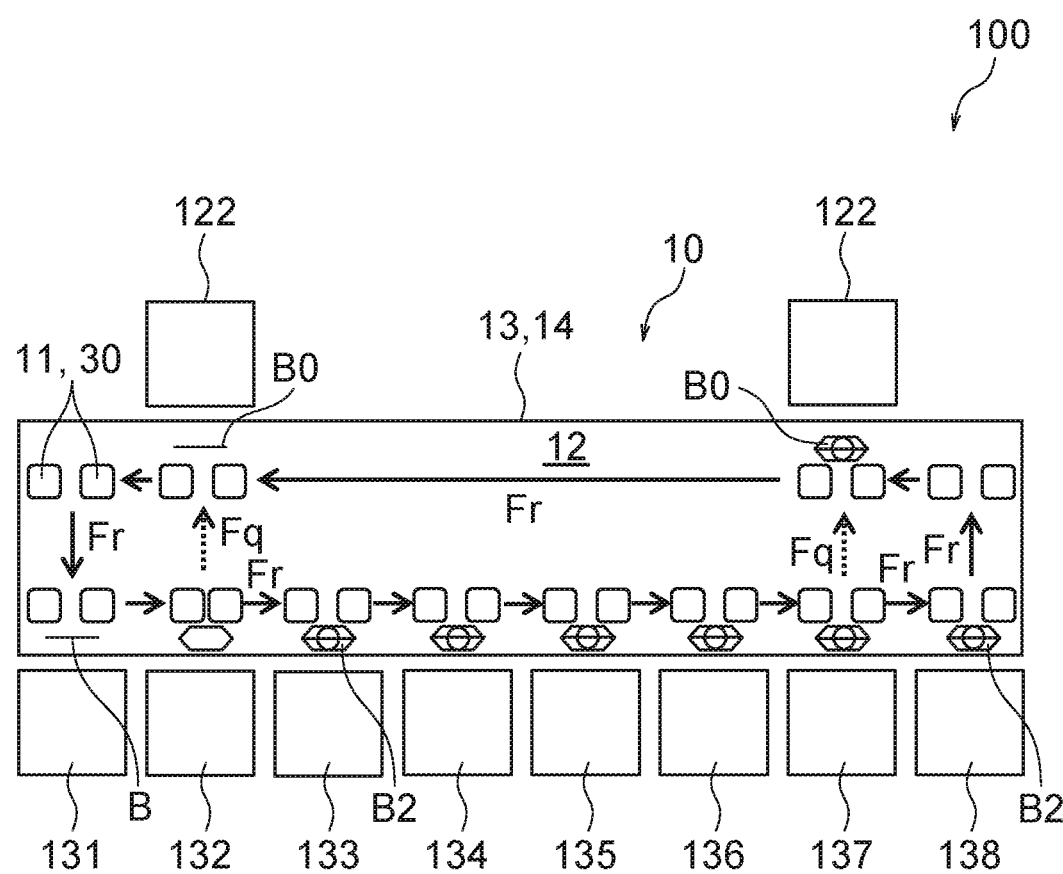
FIG. 30 is a plan view showing another example of a processing system.

FIG. 30 is a plan view showing another example of the processing system 100.

While the processing systems 100 shown in FIGS. 28 and 29 described above are provided as a system performing a packaging-related processing, the processing system 100 shown in FIG. 30 is provided as a system performing a processing related to the attachment of a spout to a bag B.

The conveyance surface 12 in the present example has a rectangular shape demarcated by two long sides and two short sides. Along one long side of the conveyance surface 12, a bag feeding device 131, a mouth opening device 132, a spout feeding temporary fixation device 133, a first spout seal heating device 134, a second spout seal heating device 135, a spout seal cooling device 136, a spout seal inspection device 137 and a good product release device 138 are installed as processing devices. Further, along the other long side of the conveyance surface 12, a plurality (two) of defective bag discharging devices 122 for discharging defective bags B0 are installed as processing devices. In the example shown in FIG. 30, these two defective bag discharging devices 122 are positioned on an opposite side, via the conveyance surface 12 (the conveyance body unit 13), from the mouth opening device 132 and the spout seal inspection device 137, respectively.

A bag holding device 30 is fixedly placed on each movable body 11. A bag B is held by a pair of bag holding devices 30 mounted on two movable bodies 11 that form a pair and move along the conveyance surface 12 along with the corresponding pair of movable bodies 11. In the example shown in FIG. 30, each pair of movable bodies 11 moves, during a normal processing, along a rectangular normal travel route Fr extending along the outer circumference of the conveyance surface 12. On the other hand, if an abnormality is detected in a bag B during a series of processes, a pair of movable bodies 11 and a pair of bag holding devices 30 that move along with the bag B in question move along a defective bag discharging route Fq, which is off the normal travel route Fr, to a defective bag discharging station where a defective bag discharging device 122 is installed.

Each pair of movable bodies 11 rotates 180 degrees along the horizontal plane when each pair of movable bodies 11 moves from one to the other of a normal travel route Fr along one long side of the conveyance surface 12 and a normal travel route Fr along the other long side. As a result, a pair of bag holding devices 30 and a bag B are arranged in a position suitable for a process of a processing device (in a position near a processing device) at each processing station.

Each pair of movable bodies 11 stops intermittently and sequentially at a plurality of processing stations provided on the normal travel route Fr. Specifically, each pair of movable bodies 11 stops intermittently at a bag feeding station, a mouth opening station, a spout feeding temporary fixation station, a first spout seal heating station, a second spout seal heating station, a spout seal cooling station, a spout seal inspection station, and a good product release station.

At each processing station, various processes are performed by a corresponding processing device while each pair of movable bodies 11 is intermittently stopped. At the bag feeding station, the bag feeding device 111 provides a bag B (in the example shown in FIG. 30, an empty flat bag) to a pair of bag holding devices 30 mounted on a pair of movable bodies 11 located at the bag feeding station.

At the mouth opening station, the mouth opening device 132 opens the mouth portion of a bag B. At the mouth opening station, a mouth opening detection device that detects an opening state of the mouth portion of a bag B is provided, and results of the detection are transmitted from the mouth opening detection device to the conveyance control unit 14. If the detection result of the mouth opening detection device indicates that the mouth portion of a bag B is properly opened, a pair of movable bodies 11, a pair of bag holding devices 30 and the bag B move to a later processing station (i.e., the spout feeding temporary fixation station) along the normal travel route Fr under the control of the conveyance control unit 14. On the other hand, if the detection result of the mouth opening detection device indicates that the mouth portion of a bag B is not properly opened, a corresponding pair of movable bodies 11 and a corresponding pair of bag holding devices 30 move, along with the bag B in question, to a corresponding defective bag discharging station along a defective bag discharging route Fq under the control of the conveyance control unit 14.

At the spout feeding temporary fixation station, the spout feeding temporary fixation device 133 prepares a spout and temporarily fixes the spout to the mouth portion of a bag B in an open state to make a spout-carrying bag B2. At the first spout seal heating station and the second spout seal heating station, the first spout seal heating device 134 and the second spout seal heating device 135 heat-seal a spout-carrying bag B2 (in particular, between the spout and the mouth portion of the bag), respectively. At the spout seal cooling station, the spout seal cooling device 136 cools a spout-carrying bag B2 (in particular, a heat-sealed portion of a spout and the mouth portion of a bag B).

At the spout seal inspection station, the spout seal inspection device 137 inspects the seal condition of a spout-carrying bag B2, and results of the inspection are transmitted from the spout seal inspection device 137 to the conveyance control unit 14 (see FIG. 1, etc.). If an inspection result indicates no abnormality in the sealing condition of a spout-carrying bag B2, a pair of movable bodies 11, a pair of bag holding devices 30, and the bag B2 move to a later processing station (i.e., the good product release station) along the normal travel route Fr under the control of the conveyance control unit 14. On the other hand, if an inspection result indicates that an abnormality is found in the sealing condition of a spout-carrying bag B2, a corresponding pair of movable bodies 11 and a corresponding pair of bag holding devices 30 move, along with the bag B2 in question, to a corresponding defective bag discharging station along a defective bag discharging route Fq under the control of the conveyance control unit 14.

At the good product release station, the good product release device 138 receives a spout-carrying bag B2 from a pair of movable bodies 11 and sends it to a later stage.

After releasing a spout-carrying bag B2 at the good product release station, a pair of movable bodies 11 moves on a normal travel route Fr along one short side of the conveyance surface 12, and then on moves a normal travel route Fr along the other long side of the conveyance surface 12.

The above-described two defective bag discharging stations are located on a normal travel route Fr along the other long side of the conveyance surface 12. At each defective bag discharging station, a corresponding defective bag discharging device 122 collects defective bags B0 (i.e., a bag B and a spout-carrying bag B2 for which an abnormality is detected) from a corresponding pair of bag holding devices 30. A pair of movable bodies 11 and a corresponding pair of bag holding devices 30 move on a normal travel route Fr along the other long side of the conveyance surface 12 immediately after releasing a bag B (i.e., a defective bag B0) at a defective bag discharging station.

Each pair of movable bodies 11 moves from the end point of a normal travel route Fr along the other long side of the conveyance surface 12, onto a normal travel route Fr along the other short side of the conveyance surface 12, and then moves again onto a normal travel route Fr along one long side of the conveyance surface 12.

First Variant Example

FIGS. 31A to 32B are diagrams showing a movable body 11 and a spout holding device 141 according to a first variant example.

In the present variant example, a processing device that performs processing using an article placed on a movable body 11 that is arranged at a corresponding processing position of the conveyance surface 12, performs processing associated with a spout S that is held by a spout holding device 141 included in the article, and in particular, performs a process of attaching a spout S to a bag B.

Figure 31A:
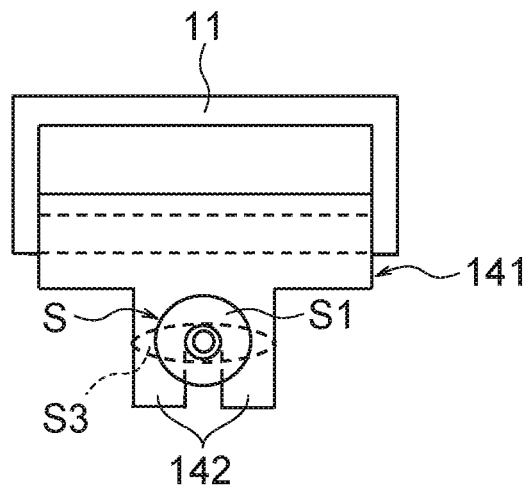
FIG. 31A is a diagram showing a movable body and a spout holding device according to a first variant example.
Figure 31B:
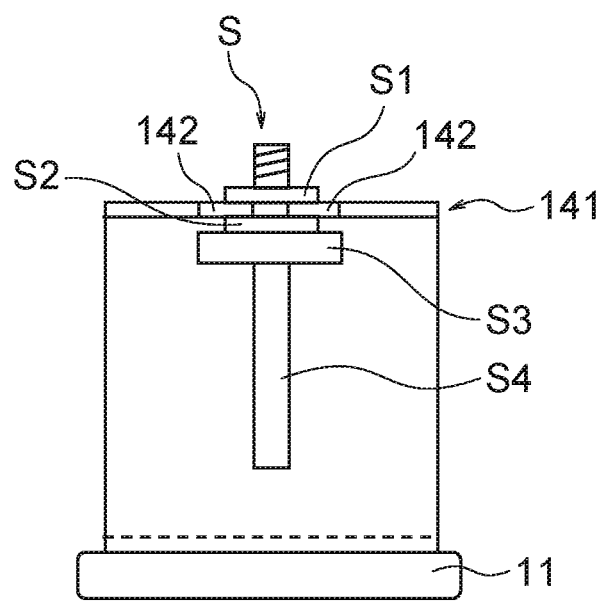
FIG. 31B is a diagram showing a movable body and a spout holding device according to a first variant example.

In the example shown in FIG. 31A (a plan view) and FIG. 31b (a side view), a spout holding device 141 is mounted, as an article described above, on a movable body 11, and the spout holding device 141 moves along with the movable body 11 along the conveyance surface 12.

The spout holding device 141 is provided to be able to hold and release a spout S. In the example shown in FIGS. 31A and 31B, a small diameter portion of a spout S (a part of a hollow straw portion S4) is held by a spout holding portion 142 of the spout holding device 141, and the small diameter portion is provided between an upper flange portion S1 and a lower flange portion S2 and has a smaller outer diameter than those of the upper flange portion S1 and the lower flange portion S2. The spout holding portion 142 has a cut groove, the small diameter portion of a spout S enters the cut groove in such a manner that spout S is held by the spout holding portion 142, and the small diameter portion of a spout S withdraws from the cut groove in such a manner that the spout S is released (discharged) from the spout holding portion 142. The width of the cut groove of the spout holding portion 142 is larger than the outer diameter of the small diameter portion of a spout S and smaller than the diameter of the upper flange portion S1 having an annular shape.

A spout S shown in FIGS. 31a and 31b has an intended attachment seal portion S3 and a straw portion S4. A part of the straw portion S4 and the intended attachment seal portion S3 are provided on the opposite side, via the lower flange portion S2, from the upper flange portion S1. The intended attachment seal portion S3 has a boat-shaped plan view and is a section to be attached to a bag B. The straw portion S4 extends through the upper flange portion S1, the lower flange portion S2 and the intended attachment seal portion S3 and forms the small diameter portion described above.

A movable body 11 and a spout holding device 141 of the present variant example can be applied to a conveyance system (i.e., a spout sealing machine) that attaches a spout S to a bag B. Such a spout sealing machine can, for example, sequentially go through the following processing stations provided on the conveyance surface 12 and perform the following processes at the respective processing stations.

At a first processing station, a spout supply device supplies a spout S to a spout holding device 141 placed on a movable body 11, so that the spout S is held by a spout holding portion 142 (a first step; see FIG. 31A and FIG. 31B).

Figure 32A:
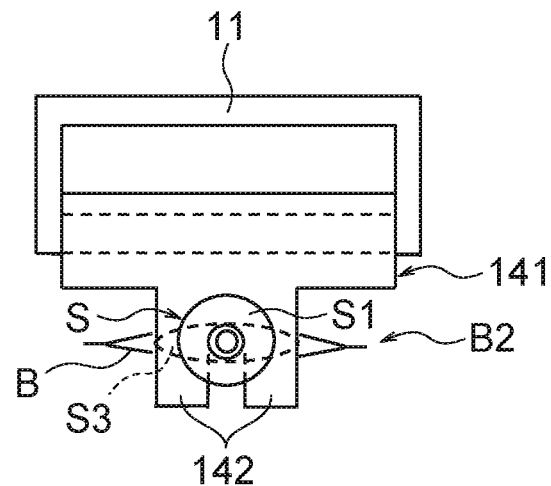
FIG. 32A is a diagram showing a movable body and a spout holding device according to a first variant example.
Figure 32B:
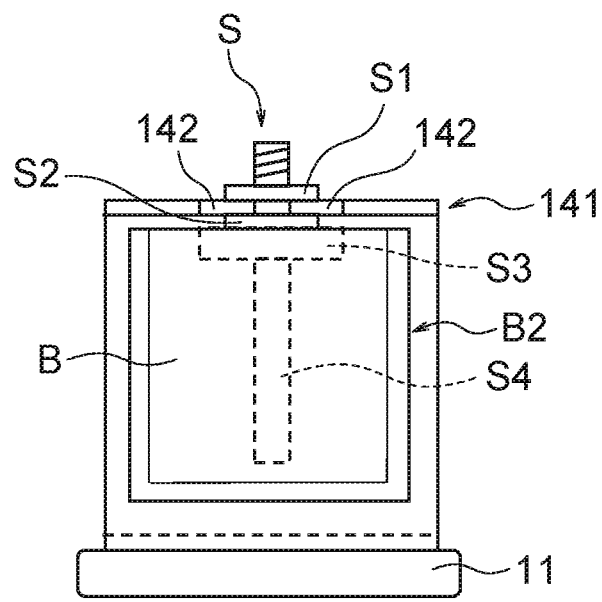
FIG. 32B is a diagram showing a movable body and a spout holding device according to a first variant example.

At a subsequent second processing station, a bag B is prepared by a bag feeding device; the mouth portion of the bag B is opened by a mouth opening device; a portion (the intended attachment seal portion S3 and the straw portion S4) of a spout S below the lower flange portion S2 is placed inside the bag B by a bag arrangement device; and after that, the spout S (in particular, the intended attachment seal portion S3) is heat-welded (temporarily sealed) to the bag B (in particular, the mouth portion) by a temporary sealing device (a second step; see FIG. 32A (a plan view) and FIG. 32B (a side view)).

At a subsequent third processing station, a spout S (in particular, the intended attachment seal portion S3) is heat-welded to a bag B (in particular, the mouth portion) (a first seal) by a first sealing device (a third step). At a subsequent fourth processing station, a spout S (in particular, the intended attachment seal portion S3) is heat-welded to a bag B (in particular, the mouth portion) (a second seal) by a second sealing device (a fourth step).

At a subsequent fifth processing station, an attachment portion (i.e., a sealed portion) of a bag B to which a spout S is attached (i.e., of a spout-carrying bag B2) is cooled by a seal portion cooling device (a fifth step). At a subsequent sixth processing station, the attachment portion (the sealed portion) of a spout-carrying bag B2 is inspected by a seal portion inspection device (a sixth step). At a subsequent seventh processing station, a spout-carrying bag B2 is released from the spout sealing machine by a release device (a seventh step).

Second Variant Example

FIGS. 33a to 34b are diagrams showing a movable body 11 and a spout holding device 141 according to a second variant example.

In the present variant example, a processing device that performs processing using an article placed on a movable body 11 that is arranged at a corresponding processing position of the conveyance surface 12, performs processing associated with a spout S that is held by a spout holding device 141 included in the article, and in particular, performs a process in which contents are introduced into the inside of a spout-carrying bag B2 having a spout S held by a spout holding device 141 and a process in which a cap V is attached to the spout S.

In the example shown in FIGS. 33a through 34b, the same elements as or corresponding elements to those in the example shown in FIGS. 31a through 32b described above are marked with the same reference numerals and their detailed descriptions are omitted.

A spout holding device 141 mounted on a movable body 11 in the present variant example is provided to be able to hold and release a spout S that a spout-carrying bag B2 comprises.

A movable body 11 and a spout holding device 141 of the present variant example can be applied to a conveyance system (i.e., a spout-carrying bag filling and packaging machine) that introduces contents inside a spout-carrying bag B2. Such a spout-carrying bag filling and packaging machine can, for example, sequentially go through the following processing stations provided on the conveyance surface 12 and perform following processes at the respective processing stations.

Figure 33A:
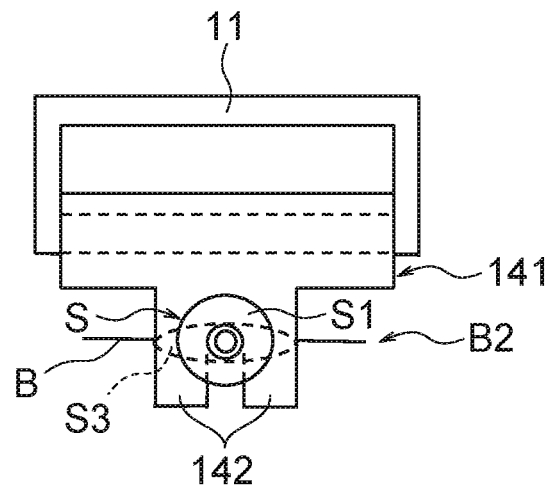
FIG. 33A is a diagram showing a movable body and a spout holding device according to a second variant example.
Figure 33B:
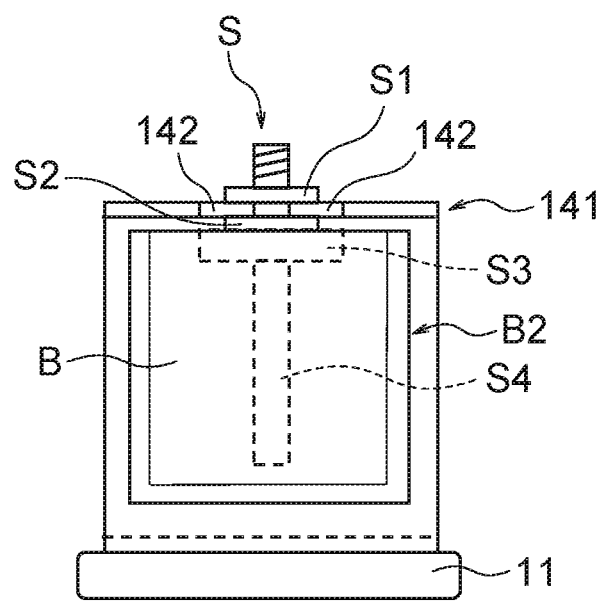
FIG. 33B is a diagram showing a movable body and a spout holding device according to a second variant example.

At a first processing station, a spout-carrying bag B2 is supplied to a spout holding device 141 placed on a movable body 11 by a spout-carrying bag supply device, so that the spout-carrying bag B2 (in particular, a spout S) is held by a spout holding portion 142 (a first step; see FIG. 33A and FIG. 33B).

In a subsequent second processing station, a printing on a spout-carrying bag B2 is performed by a printing device (a second step).

At a subsequent third processing station, a printing on a spout-carrying bag B2 is inspected by a printing inspection device (a third step).

In a subsequent fourth processing station, the inside a spout-carrying bag B2 is filled with a content (e.g., a liquid material) by a content-filling device (a fourth step).

Figure 34A:
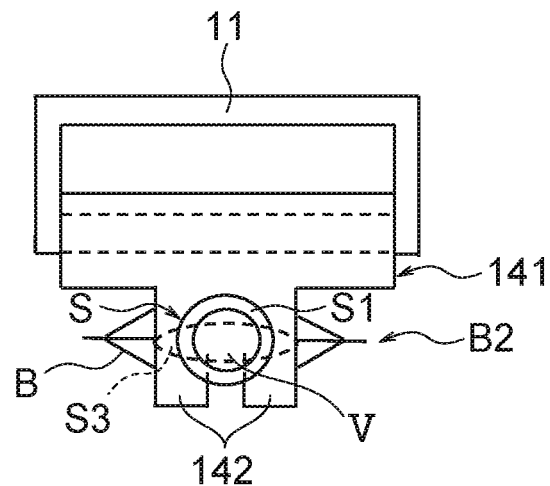
FIG. 34A is a diagram showing a movable body and a spout holding device according to a second variant example.
Figure 34B:
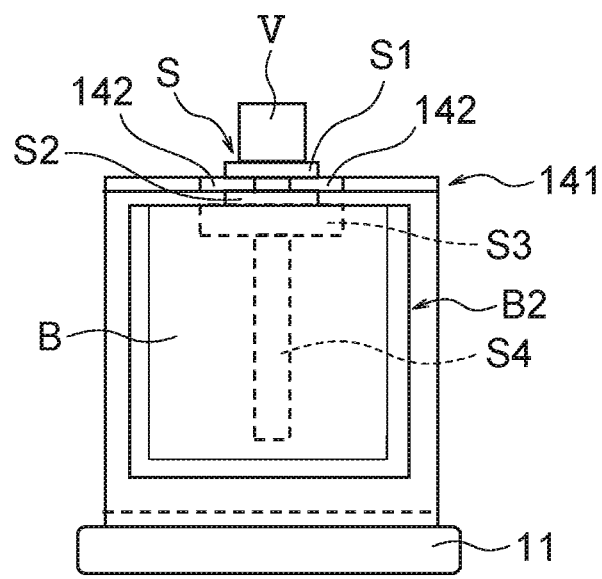
FIG. 34B is a diagram showing a movable body and a spout holding device according to a second variant example.

In a subsequent fifth processing station, a capping device attaches a cap V to a spout S of a spout-carrying bag B2 (in particular, a tip portion of a straw portion S4 of the bag B2 that is exposed outside the bag portion) to make a product bag (a fifth step; see FIG. 34A (a plan view) and FIG. 34B (a side view)).

At a subsequent sixth processing station, the condition of a cap V attached to a spout-carrying bag B2 is inspected by a capping inspection device (a sixth step).

At a subsequent seventh processing station, a product bag (i.e., a spout-carrying bag B2 with a cap V attached) is released from the spout sealing machine by a release device (a seventh step).

Other Variant Examples

An article that can be placed on a movable body 11 is not limited. For instance, a processing device installed around the conveyance surface 12 (the conveyance body unit 13) may place at least one or more packages (such as a bag) or at least one or more packaged item (including a package and a content) directly or indirectly on one or more movable body 11.

The method of attaching an article to a movable body 11 is not limited, and an article may be attached directly to a movable body 11 or may be attached to a movable body 11 via a jig, cover, or another attachment device. Although a movable body 11 shown in FIG. 1, etc. described above has a generally rectangular planar shape, it could be assumed that the shape and the size of an article to be placed on a movable body 11 may not correspond to the planar shape and the planar size of the movable body 11 (for example, an article has a round planar shape). Even in such a case, it is possible to attach an article to a movable body 11 in an appropriate state by means of a jig, cover, or another attachment device.

It should be noted that the embodiments and variations disclosed herein are merely described as examples in all respects and are not to be construed as limiting. It is possible that in the above-described embodiments and variations, omissions, replacements and changes may be made in various forms without departing from the scope and intent of the appended claims. For instance, the above embodiments and variations may be combined in whole or in part, and embodiments other than those described above may be combined with the above embodiments or variations. In addition, the effects of the present disclosure described herein are merely illustrated by an example, and other effects may be brought about.

The technical categories in which the above-described technical ideas are embodied are not limited. For instance, the above-described technical ideas may be embodied by a computer program that causes a computer to execute one or more procedures (steps) included in a method of manufacturing or using the devices described above. Further, the above-described technical ideas may also be embodied by a computer-readable non-transitory recording medium on which such a computer program is recorded.

As explained above, according to conveyance systems 10 and processing systems 100 described above, it is possible to design the system layout with a high degree of freedom, making it easy to realize a system layout that meets needs of system users. It is also possible to move a movable body 11 that conveys a defective article, such as a defective bag, out of a predetermined normal route and toward a drop-out station (a discharging/release station).

By changing the height position and a tilted posture of a movable body 11, the state of a container, such as a bag or a can, that moves along with the movable body 11 can be changed adaptively. Also, by changing the height position, the tilt posture, the rotation state, and another state of a movable body 11, the state of contents contained in a container placed on the movable body 11 can be changed adaptively. This makes it possible to prevent scattering or leaking of the contents from a container, to agitate the contents in a container, and to even out the contents in a container (i.e., to align the height of the contents in a container), as in tapping.

Further, conveyance systems 10 and processing systems 100 can flexibly deal with various articles, and even if the specifications or types of articles to be transferred are changed, the basic configuration of conveyance systems 10 and processing systems 100 often does not need to be changed. Therefore, it is possible to propose specific specifications of conveyance systems 10 and processing systems 100 to meet the system user's demands. It is also possible to realize a conveyance system 10 and a processing system 100 that can perform a series of processes without being bound by the order of the processes.

Further, by mounting a power source device 22 and a drive source device 23 on a movable body 11, the power source device 22 and drive source device 23 are provided in a movable manner, making it possible to simplify the system configuration and facilitate replacement of and maintenance work for various devices.

Additional Notes

The present disclosure may also include the following configurations.

[Item 1]

A processing system comprising a conveyance system including: a conveyance body unit having a conveyance surface; a movable body moving along the conveyance surface; and a conveyance control unit controlling a magnetism acting between the movable body and the conveyance body unit, wherein the movable body moves along the conveyance surface in a floating state where the movable body is separated from the conveyance surface due to the magnetism, wherein the conveyance control unit controls the magnetism to variably adjust one or more of a movement trajectory, a rotation state, a movement speed, a movement time and a posture of the movable body.

[Item 2]

The processing system as defined in item 1, wherein the conveyance control unit controls the magnetism to variably adjust the movement trajectory of at least the movable body.

[Item 3]

The processing system as defined in item 1 or 2, wherein the conveyance control unit controls the magnetism to variably adjust at least the rotation state of the movable body.

[Item 4]

The processing system as defined in any one of items 1 to 3, wherein the conveyance control unit controls the magnetism to variably adjust at least the posture of the movable body.

[Item 5]

The processing system as defined in any one of items 1 to 4, comprising a processing device that performs processing using an article placed on the movable body arranged in a corresponding processing position of the conveyance surface, wherein the article includes a bag holding device of holding a bag, and wherein the processing device performs a packaging-related process of the bag held by the bag holding device.

[Item 6]

The processing system as defined in any one of items 1 to 4, comprising a processing device that performs processing using an article placed on the movable body arranged in a corresponding processing position of the conveyance surface, wherein the article includes a bag holding device of holding a bag, wherein the processing device performs a process related to attachment of a spout to the bag held by the bag holding device.

[Item 7]

The processing system as defined in any one of items 1 to 4, comprising a processing device that performs processing using an article placed on the movable body arranged in a corresponding processing position of the conveyance surface, wherein the article includes a spout holding device to hold a spout, and wherein the processing device performs a process related to the spout held by the spout holding device.

[Item 8]

The processing system as defined in any one of items 1 to 4, comprising a processing device that performs processing using an article placed on the movable body arranged in a corresponding processing position of the conveyance surface, wherein the article includes at least one of a drive source device and a power source device, and wherein the processing device performs a packaging-related process of a bag.

[Item 9]

The processing system as defined in any one of items 1 to 4, comprising a processing device that performs processing using an article placed on the movable body arranged in a corresponding processing position of the conveyance surface, wherein the article includes at least one of a drive source device and a power source device, and wherein the processing device performs a process related to attachment of a spout to a bag.

[Item 10]

The processing system as defined in any one of items 1 to 9, wherein an article to be placed on the movable body includes a can.

[Item 11]

The processing system as defined in any one of items 1 to 9, wherein an article to be placed on the movable body includes a container.

[Item 12]

The processing system as defined in any one of items 1 to 9, comprising a processing device that places a wrapping on at least one movable body.

[Item 13]

The processing system as defined in any one of items 1 to 12, comprising a processing device that places a packaged item on at least one movable body.

The invention claimed is:

1. A processing system comprising:
   a conveyance system including: a conveyance body unit having a conveyance surface;
   a movable body moving along the conveyance surface;
   a conveyance control unit controlling a magnetism acting between the movable body and the conveyance body unit; and
   a processing device that performs processing using an article placed on the movable body arranged in a corresponding processing position of the conveyance surface,
   wherein the movable body moves along the conveyance surface in a floating state where the movable body is separated from the conveyance surface due to the magnetism,
   wherein the conveyance control unit controls the magnetism to variably adjust one or more of a movement trajectory, a rotation state, a movement speed, a movement time and a posture of the movable body,
   wherein the article includes a bag holding device of holding a bag, and
   wherein the processing device performs a packaging-related process of the bag held by the bag holding device.

2. The processing system as defined in claim 1, wherein the conveyance control unit controls the magnetism to variably adjust the movement trajectory of at least the movable body.

3. The processing system as defined in claim 1, wherein the conveyance control unit controls the magnetism to variably adjust at least the rotation state of the movable body.

4. The processing system as defined in claim 1, wherein the conveyance control unit controls the magnetism to variably adjust at least the posture of the movable body.

5. The processing system as defined in claim 1, wherein the article to be placed on the movable body includes a can.

6. The processing system as defined in claim 1, wherein the article to be placed on the movable body includes a container.

7. The processing system as defined in claim 1, wherein the processing device is configured to place a wrapping on at least one movable body.

8. The processing system as defined in claim 1, wherein the processing device is configured to place a packaged item on at least one movable body.

9. The processing system as defined in claim 1, wherein a plurality of movable bodies are provided;
wherein the plurality of movable bodies includes two or more movable bodies on which bag holding devices are respectively placed;
wherein two bag holding devices placed on two movable bodies forming a pair holds a bag; and
wherein the two movable bodies forming a pair can variably change a distance therebetween.

10. The processing system as defined in claim 1, wherein a normal route and an overtaking route are set up in the conveyance surface in such a manner that a subsequent movable body can overtake a preceding movable body moving along the normal route via the overtaking route.

11. A processing system comprising:
a conveyance system including: a conveyance body unit having a conveyance surface;
a movable body moving along the conveyance surface;
a conveyance control unit controlling a magnetism acting between the movable body and the conveyance body unit; and
a processing device that performs processing using an article placed on the movable body arranged in a corresponding processing position of the conveyance surface,
wherein the movable body moves along the conveyance surface in a floating state where the movable body is separated from the conveyance surface due to the magnetism,
wherein the conveyance control unit controls the magnetism to variably adjust one or more of a movement trajectory, a rotation state, a movement speed, a movement time and a posture of the movable body,
wherein the article includes a bag holding device of holding a bag, and
wherein the processing device performs a process related to attachment of a spout to the bag held by the bag holding device.

12. The processing system as defined in claim 11, wherein a normal route and an overtaking route are set up in the conveyance surface in such a manner that a subsequent movable body can overtake a preceding movable body moving along the normal route via the overtaking route.

13. A processing system comprising:
a conveyance system including: a conveyance body unit having a conveyance surface;
a movable body moving along the conveyance surface;
a conveyance control unit controlling a magnetism acting between the movable body and the conveyance body unit; and
a processing device that performs processing using an article placed on the movable body arranged in a corresponding processing position of the conveyance surface,
wherein the movable body moves along the conveyance surface in a floating state where the movable body is separated from the conveyance surface due to the magnetism,
wherein the conveyance control unit controls the magnetism to variably adjust one or more of a movement trajectory, a rotation state, a movement speed, a movement time and a posture of the movable body,
wherein the article includes a spout holding device to hold a spout, and
wherein the processing device performs a process related to the spout held by the spout holding device.

14. The processing system as defined in claim 13, wherein a normal route and an overtaking route are set up in the conveyance surface in such a manner that a subsequent movable body can overtake a preceding movable body moving along the normal route via the overtaking route.

15. A processing system comprising:
a conveyance system including: a conveyance body unit having a conveyance surface;
a movable body moving along the conveyance surface;
a conveyance control unit controlling a magnetism acting between the movable body and the conveyance body unit; and
a processing device that performs processing using an article placed on the movable body arranged in a corresponding processing position of the conveyance surface,
wherein the movable body moves along the conveyance surface in a floating state where the movable body is separated from the conveyance surface due to the magnetism,
wherein the conveyance control unit controls the magnetism to variably adjust one or more of a movement trajectory, a rotation state, a movement speed, a movement time and a posture of the movable body,
wherein the article includes at least one of a drive source device and a power source device, and
wherein the processing device performs a packaging-related process of a bag.

16. The processing system as defined in claim 15, wherein a normal route and an overtaking route are set up in the conveyance surface in such a manner that a subsequent movable body can overtake a preceding movable body moving along the normal route via the overtaking route.

17. A processing system comprising:
a conveyance system including: a conveyance body unit having a conveyance surface;
a movable body moving along the conveyance surface;
a conveyance control unit controlling a magnetism acting between the movable body and the conveyance body unit; and
a processing device that performs processing using an article placed on the movable body arranged in a corresponding processing position of the conveyance surface,
wherein the movable body moves along the conveyance surface in a floating state where the movable body is separated from the conveyance surface due to the magnetism,
wherein the conveyance control unit controls the magnetism to variably adjust one or more of a movement trajectory, a rotation state, a movement speed, a movement time and a posture of the movable body,
wherein the article includes at least one of a drive source device and a power source device, and
wherein the processing device performs a process related to attachment of a spout to a bag.

18. The processing system as defined in claim 17, wherein a normal route and an overtaking route are set up in the conveyance surface in such a manner that a subsequent movable body can overtake a preceding movable body moving along the normal route via the overtaking route.

* * * * *